(12) United States Patent
Dydo et al.

(10) Patent No.: US 9,125,243 B2
(45) Date of Patent: Sep. 1, 2015

(54) SYSTEM FOR ELECTROMAGNETIC PULSE SURFACE TREATMENT

(75) Inventors: James R. Dydo, Groveport, OH (US); Sergei P. Yushanov, Columbus, OH (US)

(73) Assignee: GATEKEY ENGINEERING, INC., Canal Winchester, OH (US)

(*) Notice: Subject to any disclaimer, the term of this patent is extended or adjusted under 35 U.S.C. 154(b) by 451 days.

(21) Appl. No.: 13/537,270

(22) Filed: Jun. 29, 2012

(65) Prior Publication Data

US 2012/0266641 A1 Oct. 25, 2012

Related U.S. Application Data

(60) Continuation of application No. 11/939,046, filed on Nov. 13, 2007, now Pat. No. 8,253,081, which is a division of application No. 11/651,138, filed on Jan. 9, 2007, now Pat. No. 7,378,622.

(60) Provisional application No. 60/758,094, filed on Jan. 11, 2006.

(51) Int. Cl.
| | |
|---|---|
| *H05B 6/10* | (2006.01) |
| *B23K 13/01* | (2006.01) |
| *B21D 22/00* | (2006.01) |
| *C21D 7/06* | (2006.01) |

(52) U.S. Cl.
CPC ............... *H05B 6/101* (2013.01); *C21D 7/06* (2013.01); *Y10T 428/12993* (2015.01)

(58) Field of Classification Search
CPC ........ H05B 6/101; B23K 20/06; B23K 20/22; B23K 9/09; B23K 2201/06; C21D 7/06; C21D 7/04; Y10T 428/12993

USPC ......... 219/602, 603, 613, 617, 607, 608, 611, 219/647, 649, 117.1; 72/17.3, 53, 56, 430, 72/705, 75; 29/419.1, 419.2, 432, 505, 29/518; 228/107, 131, 126
See application file for complete search history.

(56) References Cited

U.S. PATENT DOCUMENTS

| | | | | |
|---|---|---|---|---|
| 3,175,383 | A | * | 3/1965 | Levine .................... 29/419.2 |
| 5,003,805 | A | * | 4/1991 | Thompson .................... 72/53 |
| 5,647,238 | A | * | 7/1997 | Steidl et al. .................... 72/10.1 |
| 5,813,265 | A | | 9/1998 | Shaw et al. |
| 6,144,012 | A | | 11/2000 | Dulaney et al. |

(Continued)

*Primary Examiner* — Hung D Nguyen
(74) *Attorney, Agent, or Firm* — David J. Dawsey; Michael J. Gallagher; Gallagher & Dawsey Co., LPA

(57) ABSTRACT

A system and method for electromagnetic surface treatment of a work piece has an electromagnetic pulse generator and an electromagnetic pulse tool. The work piece has a working surface. A current pulse generated by the electromagnetic pulse generator travels through the tool producing an electromagnetic pulse. The electromagnetic pulse interacts with the working surface causing an indentation to form. A residual compressive stress layer is also formed. The indentation has a smooth and continuous topography that is described by an indentation perimeter, an indentation transition region, an indentation sidewall, an impact transition region, and an impact region. The method may also simultaneously, or subsequently, form a second indentation which overlaps with the indentation. An inter-indentation overlap region is formed when the indentations overlap. The inter-indentation overlap region is smooth and continuous. Multiple treated surfaces may easily be formed on the working surface of the work piece.

19 Claims, 26 Drawing Sheets

(56) References Cited

U.S. PATENT DOCUMENTS

| | | |
|---|---|---|
| 6,255,631 B1 | 7/2001 | Kichline et al. |
| 6,474,534 B2 | 11/2002 | Gabbianelli et al. |
| 6,630,649 B1 * | 10/2003 | Gafri et al. .................. 219/603 |
| 6,752,593 B2 | 6/2004 | Clauer et al. |
| 6,875,953 B2 | 4/2005 | Clauer et al. |
| 7,378,622 B2 | 5/2008 | Dydo et al. |
| 2004/0224179 A1 | 11/2004 | Sokol et al. |
| 2005/0035178 A1 | 2/2005 | Martin et al. |
| 2008/0061053 A1 | 3/2008 | Dydo et al. |

* cited by examiner

SYSTEM FOR ELECTROMAGNETIC PULSE SURFACE TREATMENT

CROSS REFERENCE TO RELATED APPLICATIONS

This application is a continuation of U.S. application Ser. No. 11/939,046 filed on Nov. 13, 2007 now U.S. Pat. No. 8,253,081, which is a division of U.S. patent application Ser. No. 11/651,138 filed on Jan. 9, 2007, now U.S. Pat. No. 7,378,622, which claims the benefit of U.S. provisional patent application Ser. No. 60/758,094 filed Jan. 11, 2006, the disclosures of which are incorporated by reference as if completely written herein.

STATEMENT REGARDING FEDERALLY SPONSORED RESEARCH OR DEVELOPMENT

This invention was not made as part of a federally sponsored research or development project.

TECHNICAL FIELD

The present invention relates to the field of electromagnetic pulse surface treatment for enhanced fatigue performance, and more particularly, to a method and system for forming an indentation in a work piece with an electromagnetic pulse such that the indentation has smooth and continuous transition regions.

BACKGROUND OF THE INVENTION

It is well known that cold working a surface of a metallic part will cause a residual compressive stress layer to form. The residual compressive stress layer improves the part's durability during use by suppressing tensile stress formation. In other words, forces acting on the part must first overcome the compressive stresses in the surface before destructive tensile stresses form.

Shot peening is well known in the art of surface treatment. Shot peening is a method of cold working metallic parts to form residual compressive stresses. The shot peening process consists of blasting a part with a stream of shot. As is known in the art, when individual shot strike a surface with sufficient kinetic energy, they form depressions. The depressions form due to plastic deformation. Therefore, blasting the part with many individual shot form a plastically deformed surface layer. A residual compressive stress layer accompanies the plastic deformation. In addition, the plastically deformed surface layer has a topography that is related to the shot peening parameters.

Shot peening, however, is difficult to control and therefore provides inconsistent results. Shot peening is difficult to control simply because the shot peening process has many process parameters. For example, parameters may include shot velocity, shot impingement angle, and peening time. The shot peening process must control these factors because they influence formation of the treated surface topography and the compressive stress layer. Other parameters that affect part performance include the uniformity of the surface coverage.

The shot peening process must completely cover a treatment area for that area to benefit from the surface compression formed. Even a small untreated surface in the treatment area will operate as a "weak link" during service. Unfortunately, blasting tens of thousands of shot at the working surface does not, by itself, guarantee complete coverage. To complicate the shot peening process even more, the shot breaks down during use.

As the shot breaks down, it becomes more difficult to control. Broken shot lose their ability to form depressions at a given velocity and impact angle. Shot breakdown may include normal wear and tear, and fracture. Thus, shot breakdown lessens the repeatability of the treatment area topography and residual compressive stress layer. So, in addition to control parameters, the shot peening process must have a purging system to rid itself of poorly performing shot to maintain repeatability.

The problems with shot peening do not end with process control, surface coverage, and shot breakdown. Shot peening may damage the part. In particular, shot peening may cause sharp topography to form. The sharp topography generally occurs between depressions and are known as stress concentration points. Stress concentration points magnify the tensile stresses that develop during use. So, rather than enhancing the part's performance, shot peening may lead to premature part failure.

In addition to the problems previously stated, shot peening is limited in other ways. For example, the deflected shot should be directed away from the incoming stream. So, the shape of the part is limited to those which allow the deflected shot stream to escape. Also, any surface contamination on the part may interfere with shot impact, thus lessening the effects of the shot peening process. In addition, using shot peening to treat small target areas without affecting surrounding areas is problematic. Localized shot peening treatment requires some sort of shield or mechanism which deflects the shot stream away from areas that should not be peened.

Therefore, what is needed in the art is a method for surface treatment of parts that does not require control and processing of individual shot, that is easily directed to treat specific areas of the part, that provides control of the magnitude of the deformation, that provides control of the shape of the plastic deformation, and that provides repeatable surface treatment of delicate components. Furthermore, what is needed is a method for surface treatment that provides smooth and continuous transitions between individual deformation areas, such that formation of stress concentrations is reduced or eliminated.

SUMMARY OF INVENTION

In its most general configuration, the present invention advances the state of the art with a variety of new capabilities and overcomes many of the shortcomings of prior devices in new and novel ways. In its most general sense, the present invention overcomes the shortcomings and limitations of the prior art in any of a number of generally effective configurations. The instant invention demonstrates such capabilities and overcomes many of the shortcomings of prior to methods in new and novel ways.

In one embodiment, the method for electromagnetic pulse surface treatment of a work piece includes a system for electromagnetic pulse surface treatment. The system treats a work piece having a working surface. The steps for accomplishing the method for electromagnetic surface treatment involve first mounting the work piece to a fixture. In a second step, the system positions an electromagnetic pulse tool near the working surface. In a third step, an electromagnetic pulse generator generates a current pulse. The current pulse travels through the electromagnetic pulse tool and thus the tool creates an electromagnetic pulse. The electromagnetic pulse travels from the tool toward the working surface. When the electromagnetic pulse strikes the working surface, the pulse causes an indentation to form. Each of the components of the system will now be briefly described.

In one embodiment of the instant invention, the fixture has a load bearing surface, and the work piece has a bearing surface separated from the working surface by a thickness. The tool has a tool face and a tool axis. The tool face has a tool face perimeter. The tool face is positioned at a working distance from the working surface during the step of positioning the tool. The system may position the tool axis perpendicular or at an oblique tool axis to the working surface.

The electromagnetic pulse tool is in electrical communication with the electromagnetic pulse generator. In one embodiment of the instant invention, the electromagnetic pulse generator generates the current pulse with a power supply and a capacitor. The current pulse has a current pulse duration. The current pulse travels through the electromagnetic pulse tool and the tool forms the electromagnetic pulse. The electromagnetic pulse emanates from the electromagnetic pulse tool. When the electromagnetic pulse strikes the working surface of a conductive material, the electromagnetic pulse produces eddy currents within the working surface. The working surface plastically deforms when a repulsive force causes a stress that exceeds the material's yield strength, thereby forming the indentation.

The indentation has an indentation perimeter. The system creates a treated surface having a treatment perimeter. In the embodiment where the system forms only one indentation, the treatment perimeter may be substantially the same as the indentation perimeter. The system may form multiple indentations in the treated surface. Then the treatment perimeter surrounds the treated surface. The system has a capability to form treated surfaces in localized areas, possibly in areas where tensile stresses are known to form, such as, treating welds and surface geometries which cause stress concentrations to form. Thus, the method may enhance the work piece's capability of enduring forces that cause tensile stress formation.

The present system forms the indentation with a smooth and continuous surface. As those terms are used herein, a smooth and continuous surface means a surface that may be described by one or more radii such that the treated surface has topography that distributes stress substantially evenly across the treated surface. In one embodiment, the indentation has an indentation transition region having an indentation transition radius, an indentation sidewall, an impact transition region having an impact transition region radius, and an impact region having an indentation depth. The regions are not individual sections, but represent portions of a smooth and continuous surface.

The indentation perimeter is located where the untreated surface joins the indentation transition region. The smooth and continuous nature of transition regions may be described by a radius. The indentation transition region connects to the indentation sidewall. The indentation sidewall is oblique to the impact region. The indentation sidewall in turn connects to the impact transition region. The impact transition region smoothly connects to the impact region. The indentation depth is measured from a level of the untreated surface to a deepest portion of the impact region.

The impact transition region radius describes a curvature of the impact transition region. Again, the impact transition region radius may be described by a single radius. The lack of sharp transitions in the indentation or around the indentation perimeter reduce the stress concentrations.

By forming the indentation via plastic deformation, a residual compressive stress layer is formed. The residual compressive stress layer has a compressive stress and a compressive stress layer depth. In one embodiment of the instant invention, when the system forms the indentation and the residual compressive stress layer in the working surface, no substantial changes in the stress occur in the bearing surface opposite the indentation. In one embodiment of the instant invention, no substantial deformation occurs in the bearing surface. The smooth and continuous nature of the indentations is not limited to symmetrical indentations.

In the asymmetric indentation, cross sections of the indentation may show that the various regions are not symmetric from one side of the indentation to the other. The system may intentionally form asymmetrical indentations. Asymmetrical indentations may have the indentation regions that differ from one side of a cross section to the opposite side. Similarly, the transition radius may not be substantially the same in one cross section of the indentation as in another cross section. However, the asymmetric indentations are smooth and continuous surfaces.

The method may form the indentation such that no pile-up occurs. As used herein, pile-up refers to material that is displaced from within the indentation radially to the indentation perimeter common in traditional shot peening. The present system forms the indentation, including the indentation transition regions, below the level of the untreated surface.

The smooth and continuous nature of the indentations may be adjusted by modifying the tool configuration. In one embodiment of the instant invention, the system may form the indentations at the limit of perception by creating less topography than the prior art method of shot peening. In another embodiment of the instant invention, the indentations formed may be of greater indentation depth having greater topography than the prior art method of laser shock peening. The various tool faces may include, a flat tool face, a knife edge tool face, a concave tool face, a convex tool face, other simple tool face shapes, and complex-shaped tool faces. Each tool face produces an indentation that is unique to the tool face shape. In another embodiment of the instant invention, the tool face has a pulse concentration element. The tool face may therefore affect the topography of the indentation perimeter, the transition region, the indentation sidewall, the impact transition region, the impact region, and the indentation depth.

Like the tool face, the tool face perimeter may be selected from a variety of shapes and sizes. The tool face perimeter influences a shape of the indentation perimeter. In one embodiment, the indentation is similar in shape to the tool face perimeter. By way of example and not limitation, the tool face perimeter may form a simple shape, such as, a square, a rectangle, or a circle, to name only a few. The tool face perimeter may also be more complex such as the ovals, stars, and other polygons.

As previously mentioned, the working distance also affects the indentation topography. Generally, as the working distance increases the indentation depth decreases for a given tool configuration, current pulse, and current pulse duration.

In addition to the effects of the tool face, the tool face perimeter, and other parameters, those skilled in the art will also appreciate that changing the current pulse or the current pulse duration, or both, may change the indentation characteristics. Generally, as the current pulse increases, the indentation depth increases for a given material and working distance.

The present system for electromagnetic surface treatment allows the user to form localized treated surfaces down to the size of the single indentation, as large as the entire working surface of the work piece, or to treat specific areas of the work piece. Multiple electromagnetic pulses may be directed toward the working surface to form treated surfaces that are larger, or that have indentation depths deeper, than one indentation.

In another embodiment of the instant invention, the system forms the indentation and then forms the second indentation. The second indentation may be formed anywhere on the working surface. Similar to the indentation, the second indentation has a second indentation perimeter, a second transition region, a second indentation sidewall, a second impact transition region, and a second impact region. An indent spacing may describe the distance between the indentation and the second indentation. The indent spacing may be a distance between the indentation perimeter and the second indentation perimeter.

The second transition region is described by a second indentation transition radius and the second impact transition region is described by a second impact transition region radius. The second impact region is depressed to below the untreated surface by a second indentation depth.

The system may form individual indentations separated by relatively large indent spacing such that the indentations do not overlap. In one particular embodiment of the instant invention, the indent spacing separates the indentations by a distance which substantially prevents tensile stress from forming in the treated surface.

However, in many instances, the second indentation overlaps the indentation. The system overlaps indentations in a manner which results in a smooth and continuous surface that lacks stress concentrations. Therefore, the system forms treated surfaces that are vastly different from those surfaces produced by shot peening and laser peening.

In another embodiment of the instant invention, the system forms the second indentation such that the indentation perimeters overlap. In this situation, the treated surface is encompassed by both the indentation perimeters. The indentation perimeters may form the treatment perimeter. By forming multiple indentations, large treated surfaces may be created in the working surface. In addition, the working surface may include multiple treated surfaces, including one or more indentations, adjacent to one or more untreated surfaces.

In the case of overlapping indentations, the overlap forms an inter-indentation overlap region. The inter-indentation overlap region has an overlap impact transition region which is a smooth, continuous surface that is described by an overlap impact transition region radius. The overlap impact transition region joins an overlap sidewall that is obliquely disposed from the impact region. The overlap sidewall joins an overlap transition region having an overlap transition region radius that describes its curvature. The overlap transition region joins an overlap working region. The overlap working region is a smooth and continuous transition and, in one embodiment, is described by an overlap radius. The overlap working region may reside below the level of the untreated surface by an overlap depth. The overlap depth may depend on the indent spacing. In another embodiment, where the indentation and the second indentation substantially overlap, the overlap depth may be approximately equal to, or greater than, the indentation depth and approximately equal to, or greater than, the second indentation depth.

In another embodiment, the indent spacing is such that the residual compressive stress layer is continuous through the inter-indentation overlap region. Thus it is possible to create graduated stress profiles with the system. A desired level of stress may be achieved without forming stress concentrations by creating multiple overlapping indentations to target a desired overlap depth.

The inter-indentation overlap region has a second overlap transition region, a second overlap sidewall, and a second overlap impact transition region. As with the other transition regions, the second overlap transition region has a second overlap transition region radius, and the second overlap impact transition region has a second overlap impact transition region radius. The second regions describe the surface of the second indentation in the inter-indentation overlap region. The system, therefore, produces treated surfaces having inter-indentation overlap regions with smooth and continuous transition regions. As with the indentation, the inter-indentation overlap region does not need to be symmetrical.

Asymmetry of the inter-indentation overlap region may be intentional. The system may intentionally form the second indentation by, for example, varying the tool face, the tool face perimeter, the working distance, the tool axis, and the current pulse duration, from the indentation resulting in an asymmetric inter-indentation overlap region.

In another embodiment of the instant invention, the system may form the treated surfaces which have a variety of shapes. In addition, the treatment perimeter shape may differ from the tool face perimeter. The system may form treated surfaces to completely cover the working surface, or the system may form treated surfaces to cover uniquely shaped areas. Usually, the treated surfaces will be those areas where, when the work piece is in service, tensile stresses develop on areas with initial residual tensile stress.

The system may utilize other tool configurations. In its simplest form the system for electromagnetic surface treatment has of a single electromagnetic pulse tool connected to a single electromagnetic pulse generator. However, multiple electromagnetic pulse tools in electrical communication with the electromagnetic pulse generator are possible. Further, a single tool may have multiple pulse concentration elements to generate multiple indentations per current pulse. Also, multiple tools may be connected to a single electromagnetic pulse generator or an equal number of electromagnetic pulse generators. The system may therefore have multiple tool faces and tool face perimeters in a prearranged pattern that may be discharged individually according to a predetermined order, or discharged simultaneously, to form treated surfaces having smooth and continuous surfaces.

In another embodiment of the instant invention, the system has a controller. In one embodiment of the system, the controller is preprogrammed with a variety of data and information regarding optimum tool parameters, current pulse, and current pulse duration for various material types and for the shape and size of the work piece. In addition, the controller may also be preprogrammed with tool face and tool face perimeters that form treated surfaces having a predetermined shape or predetermined stress levels for a variety of work piece shapes and materials. The controller may also coordinate tool changes, such that the system may use a variety of tool faces and tool face perimeters on a single work piece. In another embodiment of the instant invention, the controller may move the tool while energizing the electromagnetic pulse generator.

These variations, modifications, alternatives, and alterations of the various embodiments may be used alone or in combination with one another, as will become more readily apparent to those with skill in the art with reference to the following detailed description of the embodiments and the accompanying figures and drawings.

BRIEF DESCRIPTION OF THE DRAWINGS

Without limiting the scope of the present invention as claimed below and referring now to the drawings and figures:

DETAILED DESCRIPTION OF THE INVENTION

A system (50) and method for electromagnetic pulse surface treatment of the present invention enables a significant advance in the state of the art. The embodiments of the system accomplish this by new and novel methods that are configured in unique and novel ways and which demonstrate previously unavailable but preferred and desirable capabilities. The description set forth below in connection with the drawings is intended merely as a description of the present embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention.

Figure 1:
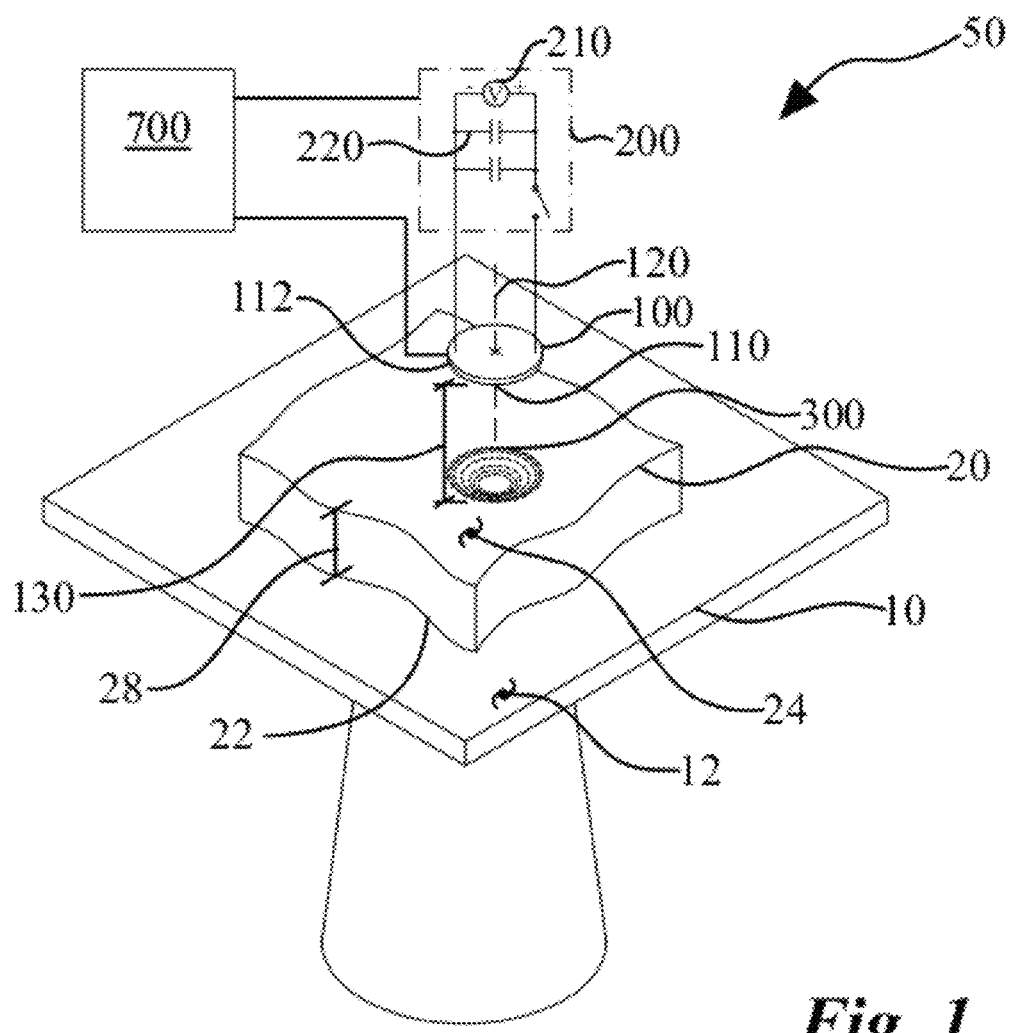
FIG. 1 shows an embodiment of a system for electromagnetic surface treatment, not to scale.

In one embodiment, as seen in FIG. 1, the method for electromagnetic pulse surface treatment of a work piece (20) includes a system for electromagnetic pulse surface treatment (50). The system (50) treats a work piece (20) having a working surface (24). The steps for accomplishing the method for electromagnetic surface treatment involve first mounting the work piece (20) to a fixture (10). In a second step, the system (50) positions an electromagnetic pulse tool (100) near the working surface (24). In a third step, an electromagnetic pulse generator (200) generates a current pulse. The current pulse travels through the electromagnetic pulse tool (100) and thus the tool (100) creates an electromagnetic pulse. The electromagnetic pulse travels from the tool (100) toward the working surface (24). When the electromagnetic pulse strikes the working surface (24), the pulse causes an indentation (300) to form. The electromagnetic pulse tool (100) may then be moved to another location, and the work piece (20) removed from the fixture (10). Alternatively, the system (50) may form additional indentations (300). Now, each of the components of the system (50) will be described in greater detail.

As seen in FIG. 1, in one embodiment of the instant invention, the fixture (10) has a load bearing surface (12), and the work piece (20) has a bearing surface (22) separated from the working surface (24) by a thickness (28). Thus, when the work piece (20) is mounted to the fixture (10), the load bearing surface (12) is in contact with the bearing surface (22).

With continued reference to FIG. 1, the tool (100) has a tool face (110) and a tool axis (120). The tool face (110) has a tool face perimeter (112). As seen in FIG. 1, in one embodiment the tool face (110) is flat and the tool face perimeter (112) is circular. Other configurations of the tool (100) and the associated affect on the indentation (300) will be discussed in more detail later.

The tool face (110) is positioned at a working distance (130) from the working surface (24) during the step of positioning the tool (100). As seen in FIG. 1, the system (50) may position the tool axis (120) perpendicular to the working surface (24). However, the system (50) is capable of positioning the tool (100) at an oblique tool axis (120) to the working surface (24).

As previously discussed, the electromagnetic pulse tool (100) is in electrical communication with the electromagnetic pulse generator (200). In one embodiment of the instant invention, the electromagnetic pulse generator (200) generates the current pulse. As seen in FIG. 1, the electromagnetic pulse generator (200) has a power supply (210) and a capacitor (220). The current pulse has a current pulse duration. The current pulse travels through the electromagnetic pulse tool (100) and the tool (100) forms the electromagnetic pulse. The current pulse is one parameter that influences a magnetic flux density of the electromagnetic pulse.

Figure 2:
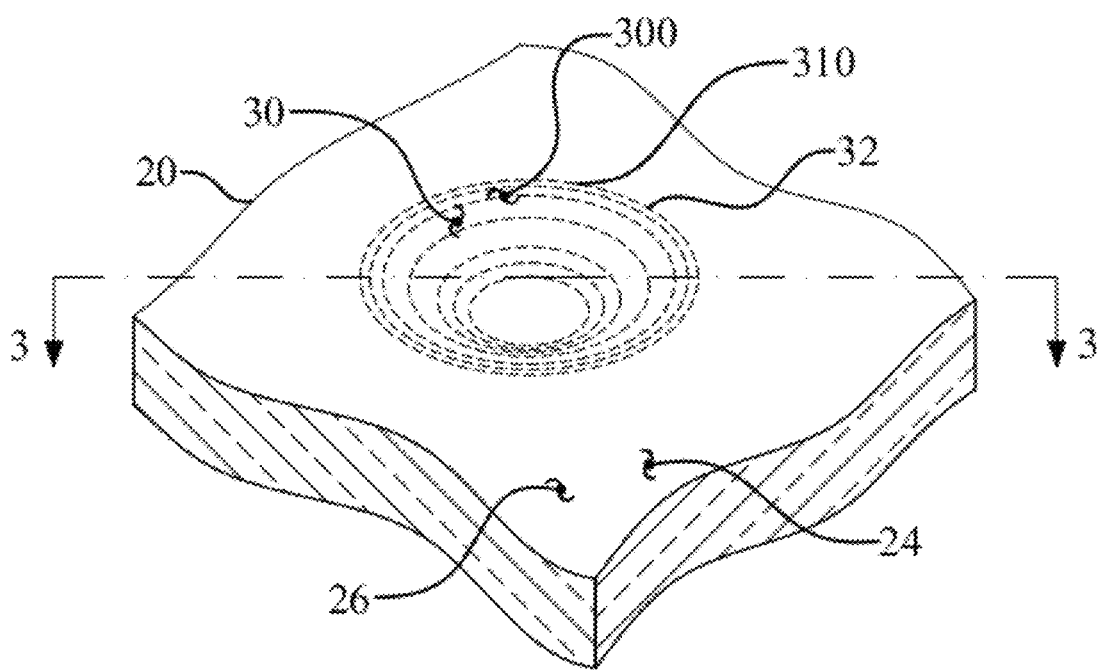
FIG. 2 is an isometric view of an indentation formed with one embodiment of the system for electromagnetic surface treatment, not to scale.

As previously mentioned, the electromagnetic pulse emanates from the electromagnetic pulse tool (100). When the electromagnetic pulse strikes the working surface (24) of a conductive material, such as metal, the electromagnetic pulse produces eddy currents within the working surface (24). In turn, the eddy currents form an opposing magnetic field that creates repulsive forces. The repulsive forces act on the working surface (24). The working surface (24) plastically deforms when the repulsive force causes a stress that exceeds the material's yield strength, thereby forming the indentation (300). As seen in FIGS. 1 and 2, the indentation (300) is an engineered depression in the working surface (24).

With reference to FIG. 2, the indentation (300) has an indentation perimeter (310). The system (50) creates a treated surface (30) having a treatment perimeter (32) by forming the indentation (300). In the embodiment where the system (50) forms only one indentation (300), the treatment perimeter (32) may be substantially the same as the indentation perimeter (310), as seen in FIG. 2. Alternatively, the system (50) may form multiple indentations (300) in the treated surface (30), such as those seen in FIGS. 20 and 21, where the treatment perimeter (32) surrounds the treated surface (30). When the treated surface (30) is smaller than the working surface (24), the treated surface (30) may be adjacent to an untreated surface (26). Therefore, the working surface (24) may have treated surfaces (30) surrounded by untreated surfaces (26), or untreated surfaces (26) surrounded by treated surfaces (30). In any case, the system (50) has a capability to form treated surfaces (30) in localized areas, possibly in areas where tensile stresses are known to form, such as, treating welds and surface geometries which cause stress concentrations to form. Thus, the method may enhance the work piece's (20) capability of enduring forces that cause tensile stress formation. A detailed description of the single indentation (300) is necessary for a thorough understanding of the invention. A cross-section of the indentation (300) is seen in FIG. 3.

Figure 3:
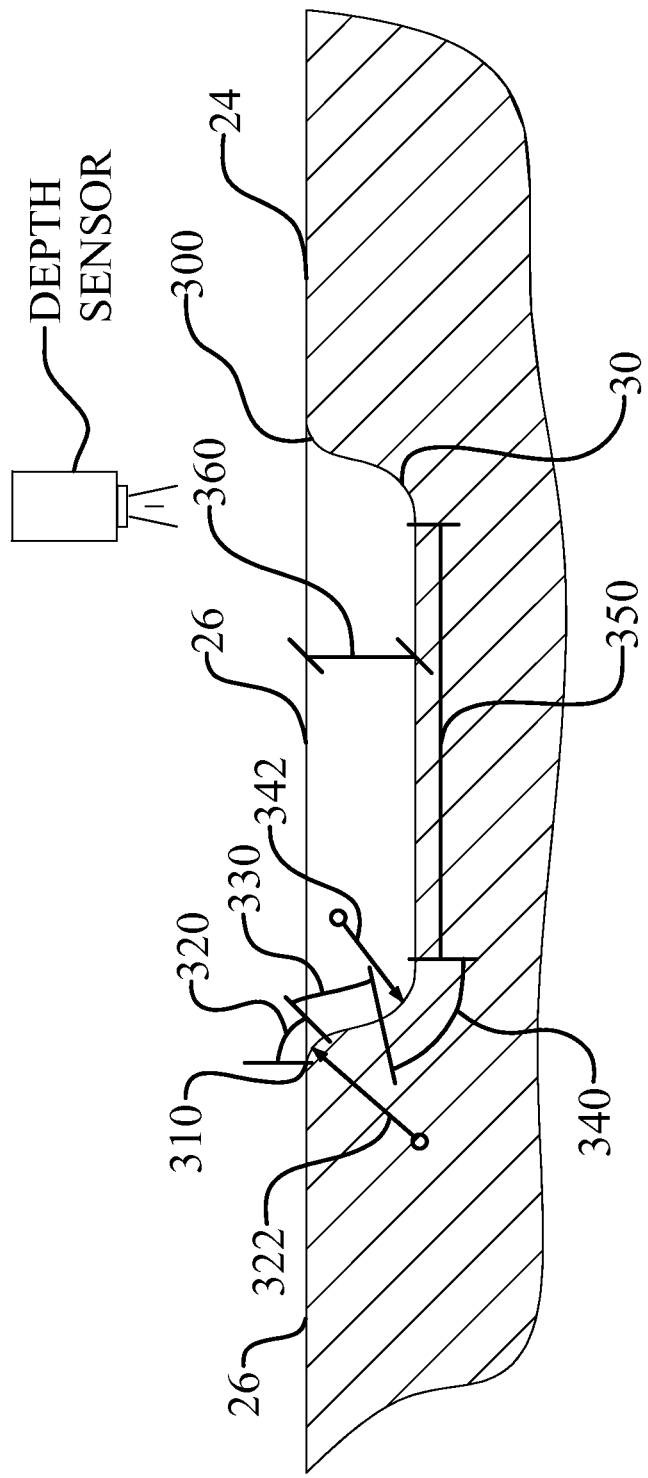
FIG. 3 is a cross-sectional view of the indentation taken along section line 3-3 in FIG. 2, showing a topography of the indentation, not to scale.

Unlike the prior art, the present system (50) forms the indentation (300), as seen in FIG. 3, with a smooth and continuous surface. As those terms are used herein, a smooth and continuous surface means a surface that may be described by one or more radii such that the treated surface (30) has topography that distributes stress substantially evenly across the treated surface (30). By contrast, a geometric discontinuity focuses or concentrates stress making it more likely that catastrophic failure will occur. In one embodiment, the indentation (300) has an indentation transition region (320) having an indentation transition radius (322), an indentation sidewall (330), an impact transition region (340) having an impact transition region radius (342), and an impact region (350) having an indentation depth (360). With reference to FIG. 3, the regions (320, 330, 340, 350) are not individual sections, but represent portions of a smooth and continuous surface.

With continued reference to FIG. 3, the indentation perimeter (310) is located where the untreated surface (26) joins the indentation transition region (320). While only one radius (322) is shown in FIG. 3 for simplicity, specifically to illustrate the smooth and continuous nature of transition regions (320), the indentation transition region (320) may be a surface described by multiple radii. The indentation transition region (320) connects to the indentation sidewall (330).

As seen in FIG. 3, the indentation sidewall (330) is oblique to the impact region (350). Although FIG. 3 shows the indentation sidewall (330) as oriented at an obtuse angle relative to the impact region (350), the indentation sidewall (330) may be nearly perpendicular with the impact region (350), or, alternatively, it may be nearly parallel with the impact region (350). The indentation sidewall (330) in turn connects to the impact transition region (340). As seen in FIG. 3, the impact transition region (340) smoothly connects to the impact region (350). The indentation depth (360) is measured from a level of the untreated surface (26) to a deepest portion of the impact region (350).

The impact transition region radius (342) describes a curvature of the impact transition region (340). Again, for simplicity purposes, the impact transition region radius (342) is described by a single radius, as seen in FIG. 3. It will be obvious to those skilled in the art that when the radii (322, 342) become smaller, the impact transition and transition regions (320, 340) sharpen, and, conversely, as the radii (322, 342) lengthen the impact transition and transition regions (320, 340) are more flat. Thus, larger radii (322, 342) make smoother transition regions (320, 340). The lack of sharp transitions in the indentation (300) or around the indentation perimeter (310) reduce the stress concentrations. Consequently, the smoothness may enable the work piece (20) to endure higher tensile loads than a comparative work piece (20) having the untreated surface (26) or a shot peened surface.

Figure 4:
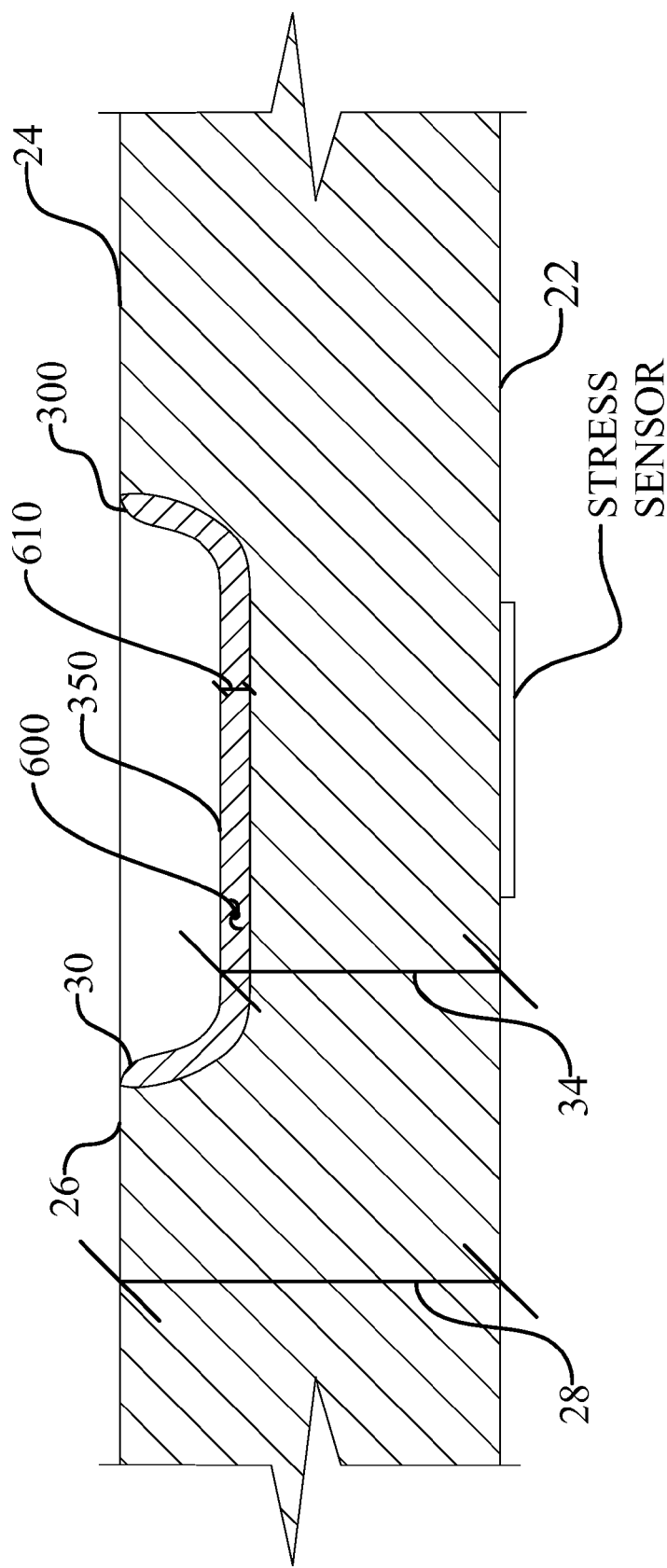
FIG. 4 is a cross-sectional view of the indentation taken along section line 3-3 in FIG. 2, showing a residual compressive stress layer, not to scale.

As seen in FIG. 4, by forming the indentation (300) via plastic deformation, a residual compressive stress layer (600) is formed. The residual compressive stress layer (600) has a compressive stress and a compressive stress layer depth (610). In one embodiment of the instant invention, when the system (50) forms the indentation (300) and the residual compressive stress layer (600) in the working surface (24), no substantial changes in the stress occur in the bearing surface (22) opposite the indentation (300). As seen only in FIG. 4, a compressed thickness (34) separates the impact region (350) from the bearing surface (22). In one embodiment, the compressed thickness (34) is less than the thickness (28). That is, no substantial deformation occurs in the bearing surface (22). Therefore, the system (50) is capable of imparting the residual compressive stress layer (600) in the working surface (24) without disturbing the stress level of the bearing surface (22). In addition, the system (50) is capable of imparting the residual compressive stress layer (600) without deforming the work piece (20). As a whole then, the work piece (20) substantially retains its original shape during surface treatment with the system (50). By way of example and not limitation, the system (50) may treat one side of a thin sheet of metal without deforming the sheet or disturbing any stresses on an opposite side.

Figure 8:
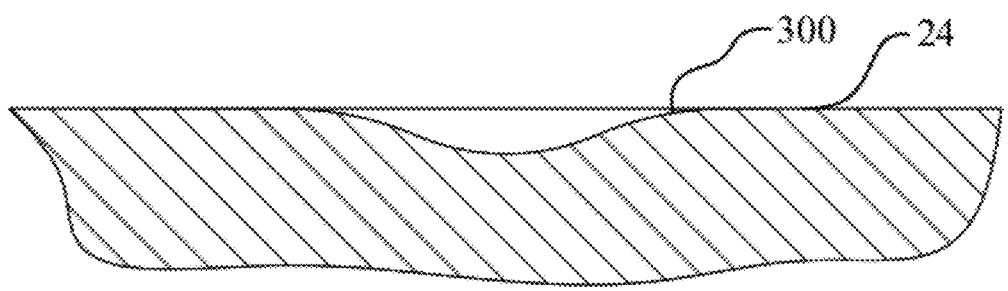
FIG. 8 is a cross-sectional view of an indentation illustrating a curvilinear surface formed by the system, not to scale.

By way of example and not limitation, in an embodiment of the instant invention, the indentation transition region (320), impact transition region (340), indentation sidewall (330), and impact transition region (340) are curvilinear, as seen in FIG. 8. Thus, when an external load is placed on the work piece (20) such that tensile stresses form in the treated surface (30), the tensile stresses are distributed uniformly. In another embodiment of the instant invention, the indentation (300) may be very long, measured in meters along any given dimension, and the indentation transition radius (322) and impact transition region radius (342) may be greater than 1 millimeter. The system (50) forms radii (322, 342) greater than 1 millimeter to reduce stress concentration in the treated surface (30). In yet another embodiment of the instant invention, the indentation transition radius (322) and impact transition region radius (342) are greater than 10 millimeters. The radii (322,342) having dimensions greater than 10 millimeters further reduce the likelihood of stress concentrations. The smooth and continuous nature of the indentations (300) is not limited to symmetrical indentations (300).

Figure 5:
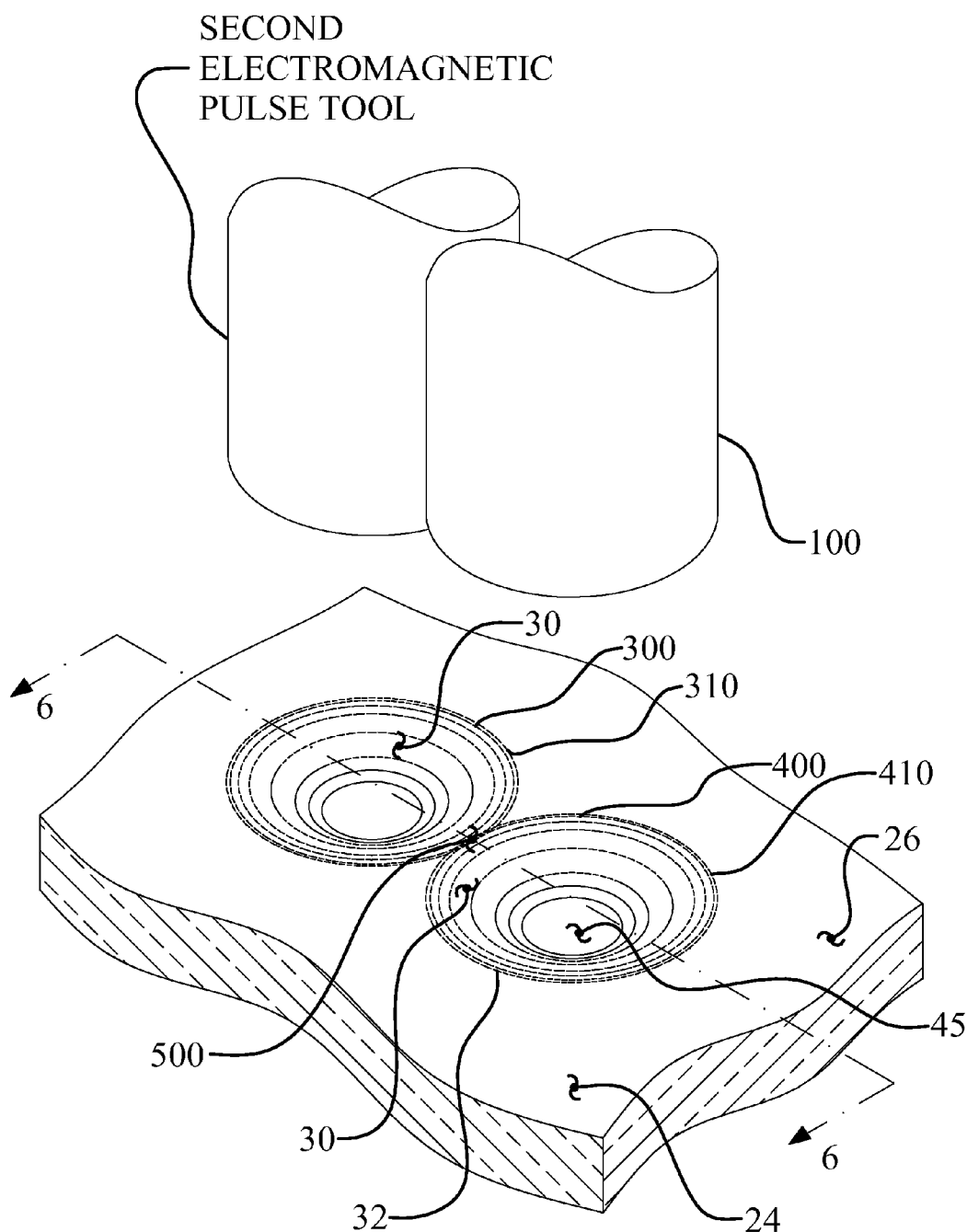
FIG. 5 is an isometric view of two overlapping indentations, not to scale.

The indentations (300) illustrated in FIGS. 1, 2, and 5 are substantially symmetrical. For example, as seen in FIG. 3, for each cross section of the indentation (300), each of the transition regions (320) is substantially identical, each of the indentation sidewalls (330) is substantially identical, and each of the impact transition regions (340) is substantially identical. Likewise, each of the indentation transition radius (322) and the impact transition region radius (342) are substantially identical. However, the system (50) may not always form symmetrical indentations (300). In fact, asymmetrical indentations (300) may be preferred.

Figure 26:
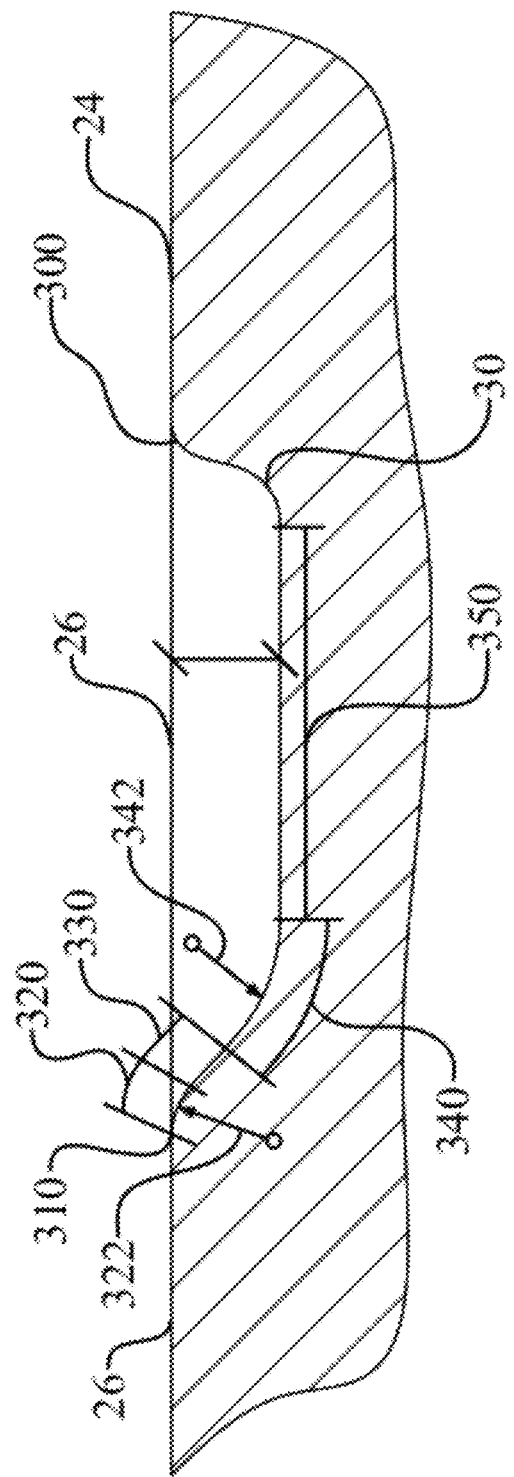
FIG. 26 is a cross-sectional view of the asymmetric indentation taken along section line 26-26 in FIG. 25, showing a topography of the asymmetric indentation, not to scale.

As seen in FIG. 26, in the asymmetric indentation (300), cross sections of the indentation (300) may show that the various regions (320, 340, 350) are not symmetric from one side of the indentation (300) to the other. The system (50) may intentionally form asymmetrical indentations (300) when, for example, the tool face (110) is not symmetrical, or the tool axis (120) is oriented at an oblique angle relative to the working surface (24). Asymmetrical indentations (300) may have the indentation regions (320, 330, 340, 350) that differ from one side of a cross section to the opposite side. Similarly, the transition radius (322, 342) may not be substantially the same in one cross section of the indentation (300) as in another cross section. However, the asymmetric indentations (300) are smooth and continuous surfaces.

With reference to FIG. 3, unlike in the prior art method of shot peening, the method forms the indentation (300) such that no pile-up occurs. As used herein, pile-up refers to material that is displaced from within the indentation (300) radially to the indentation perimeter (310) common in traditional shot peening. Pile-up material may also protrude above the level of the untreated surface (26). Usually pile-up has sharp topography that may be associated with stress concentrations. So, the material that plastically deforms moves outward rather than being compressed downward. In other words, the present system (50) forms the indentation (300), including the indentation transition regions (320), below the level of the untreated surface (26). In one embodiment, the system (50) does not form pile-up along the indentation perimeter (310). Thus, the method may substantially prevent stress concentrations from forming within the treated surfaces (30).

As previously mentioned, the smooth and continuous nature of the indentations (300) may be adjusted by modifying the tool (100) configuration. For example, changes in the tool face (110), the tool perimeter (112), the working distance (130), and the tool axis (120) may change the indentation (300) topography. By way of example and not limitation, in one embodiment of the instant invention, the system (50) may form the indentations (300) at the limit of perception by creating less topography than the prior art method of shot peening. In another embodiment of the instant invention, the indentations (300) formed may be of greater indentation depth (360) having greater topography than the prior art method of laser shock peening.

Figure 9:
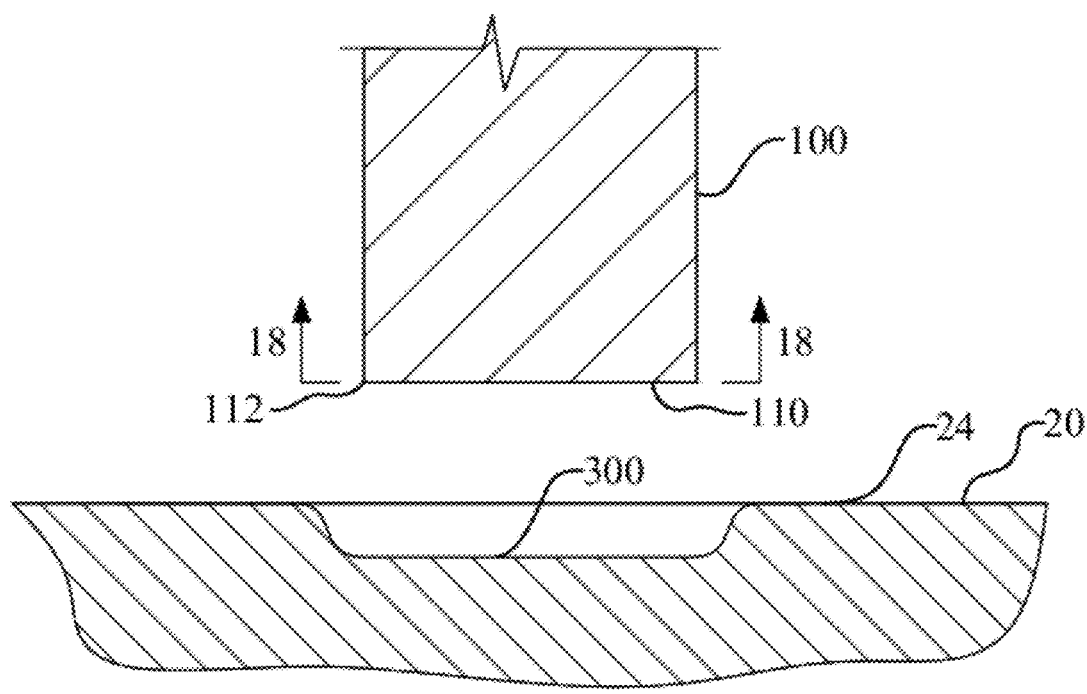
FIG. 9 is a cross-sectional view of an embodiment of a flat tool face for forming an indentation, not to scale.
Figure 10:
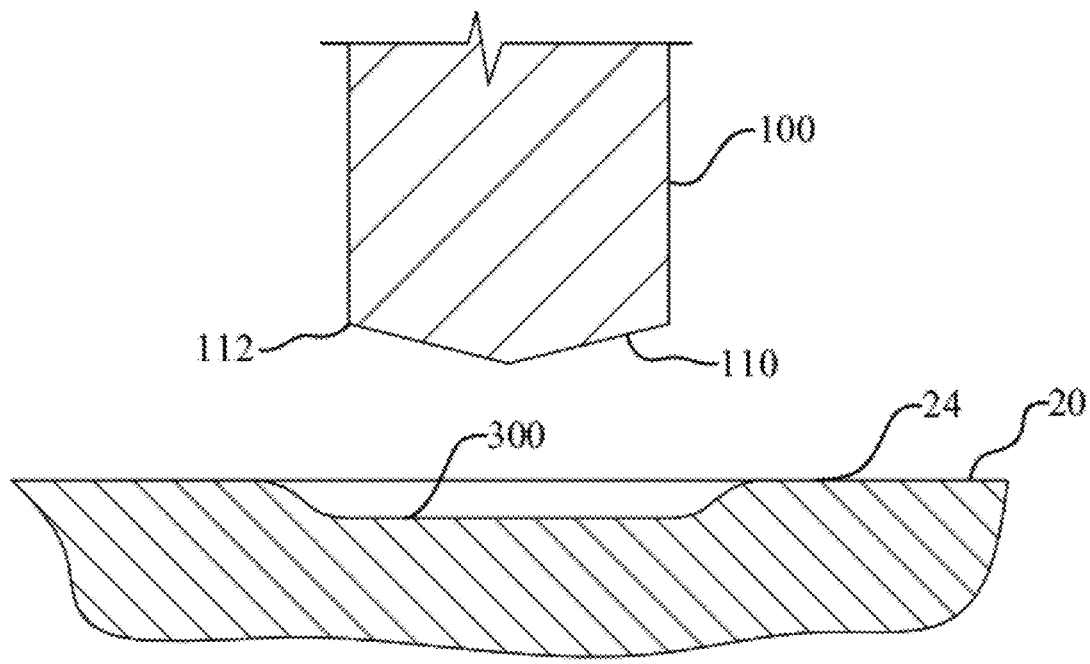
FIG. 10 is a cross-sectional view of an embodiment of a wedge shaped tool face for forming an indentation, not to scale.
Figure 11:
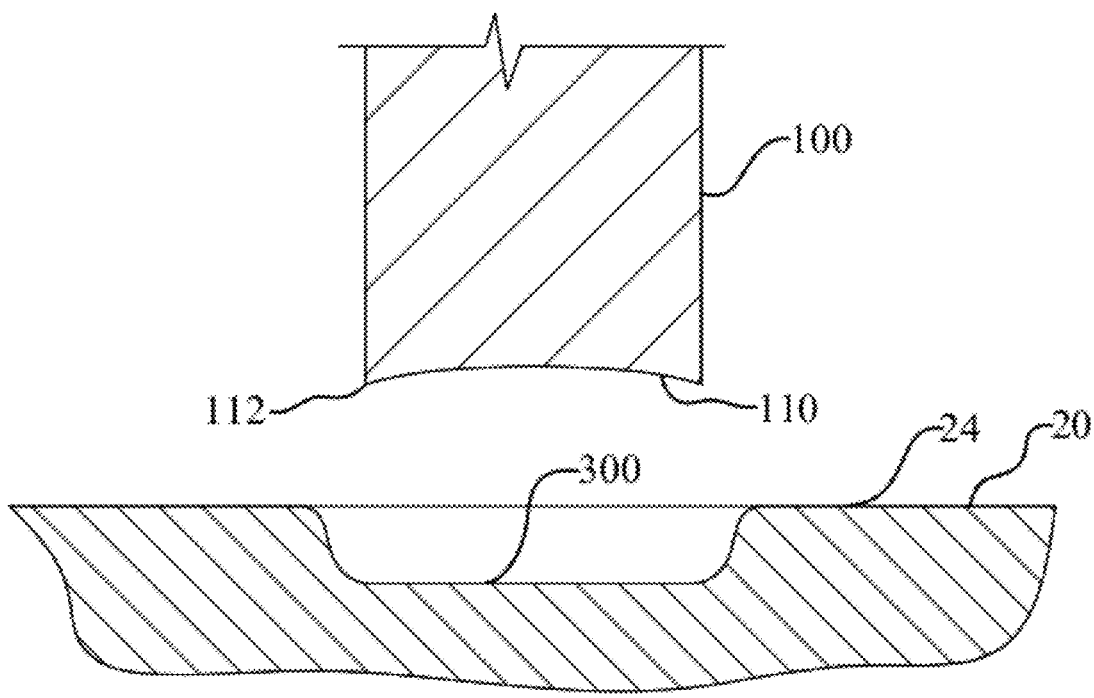
FIG. 11 is a cross-sectional view of an embodiment of a concave tool face for forming an indentation, not to scale.
Figure 12:
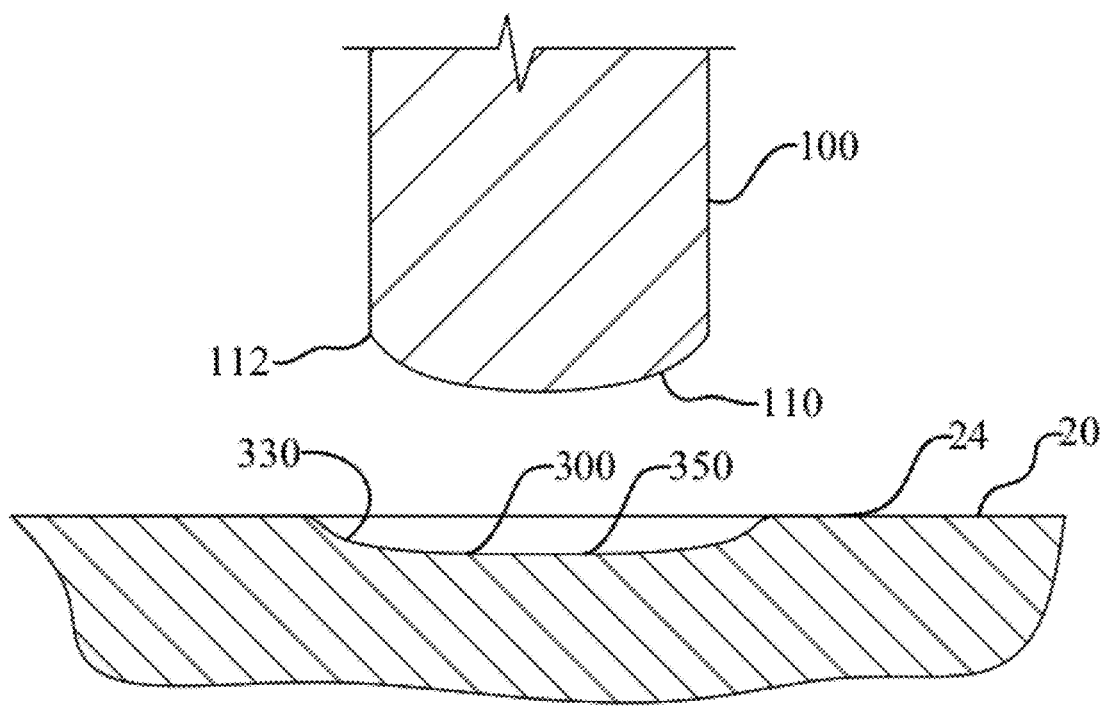
FIG. 12 is a cross-sectional view of an embodiment of a convex tool face for forming an indentation, not to scale.

By way of example and not limitation, changes in tool face (110) include, for example, those seen in FIGS. 9 through 17, where the tool axis (120) is normal to the working surface (24). As seen in FIG. 9, when the tool face (110) is flat, the indentation (300) resulting from the electromagnetic pulse is different from the indentation (300) resulting when the tool face (110) is formed by two intersecting planes which form a line at their intersection and that extend toward the working surface (24). This "knife edge" tool face (110) is seen in FIG. 10. Of course those skilled in the art will appreciate that other electromagnetic pulse tools (100) are possible. For instance, the tool face (110) may be concave, as seen in FIG. 11, having a unique indentation (300). Alternatively, the tool face (110) may be convex, as seen in FIG. 12. Other simple tool face (110) geometries may include cones, pyramids, and wedges. Generally, the more concave the tool face (110), the more perpendicular the indentation sidewall (330) is to the impact region (350). Alternatively, the more convex the tool face (110), the less perpendicular the indentation sidewall (330) is to the impact region (350) resulting in a more smooth treated surface (30).

Figure 13:
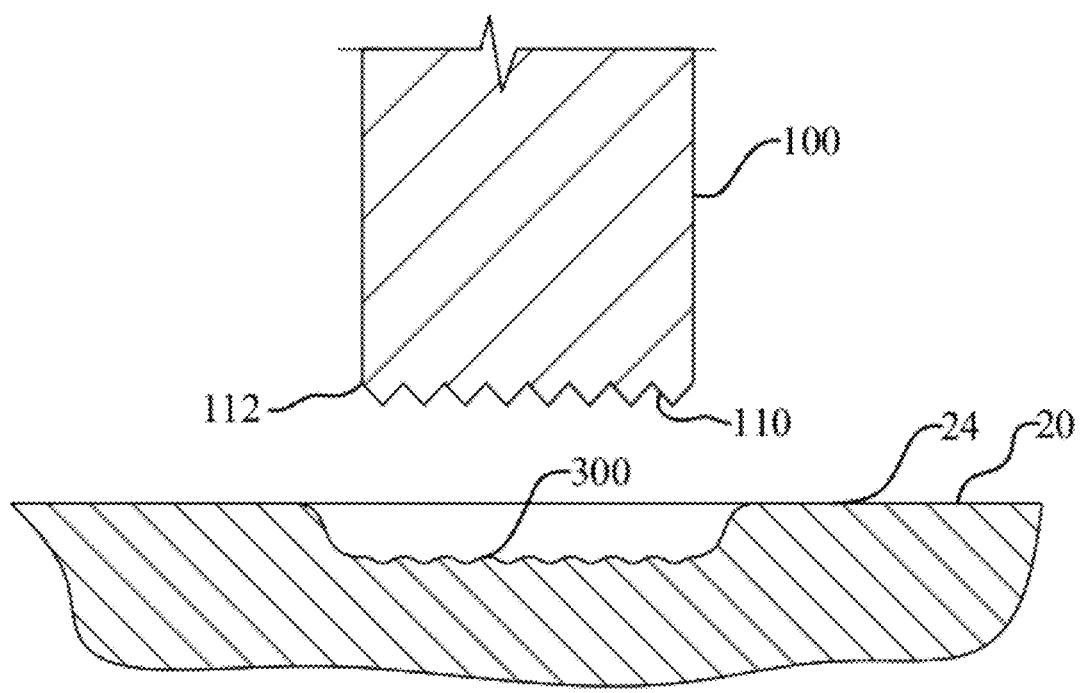
FIG. 13 is a cross-sectional view of an embodiment of a discontinuous regular tool face for forming an indentation, not to scale.
Figure 14:
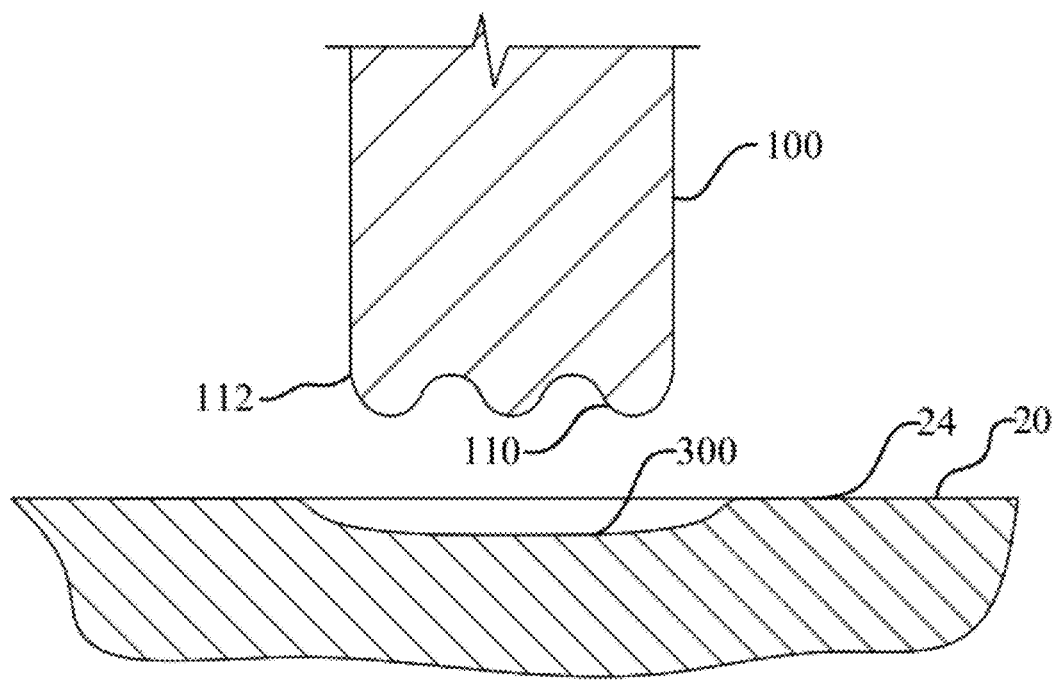
FIG. 14 is a cross-sectional view of an embodiment of a continuous regular tool face for forming an indentation, not to scale.
Figure 15:
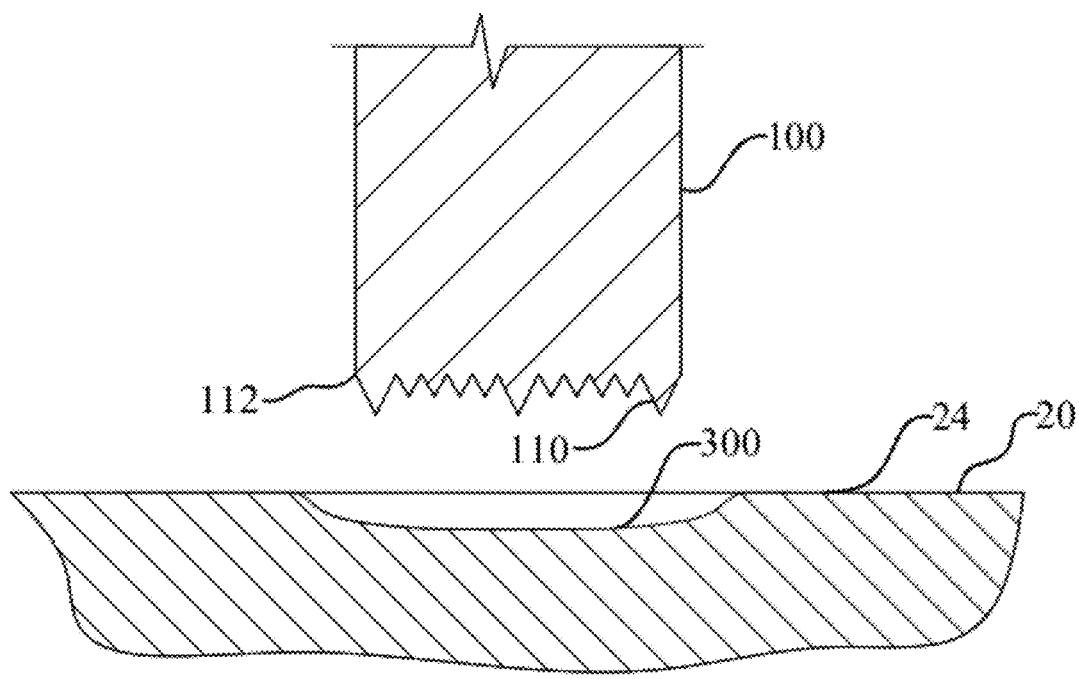
FIG. 15 is a cross-sectional view of an embodiment of a discontinuous irregular tool face for forming an indentation, not to scale.
Figure 16:
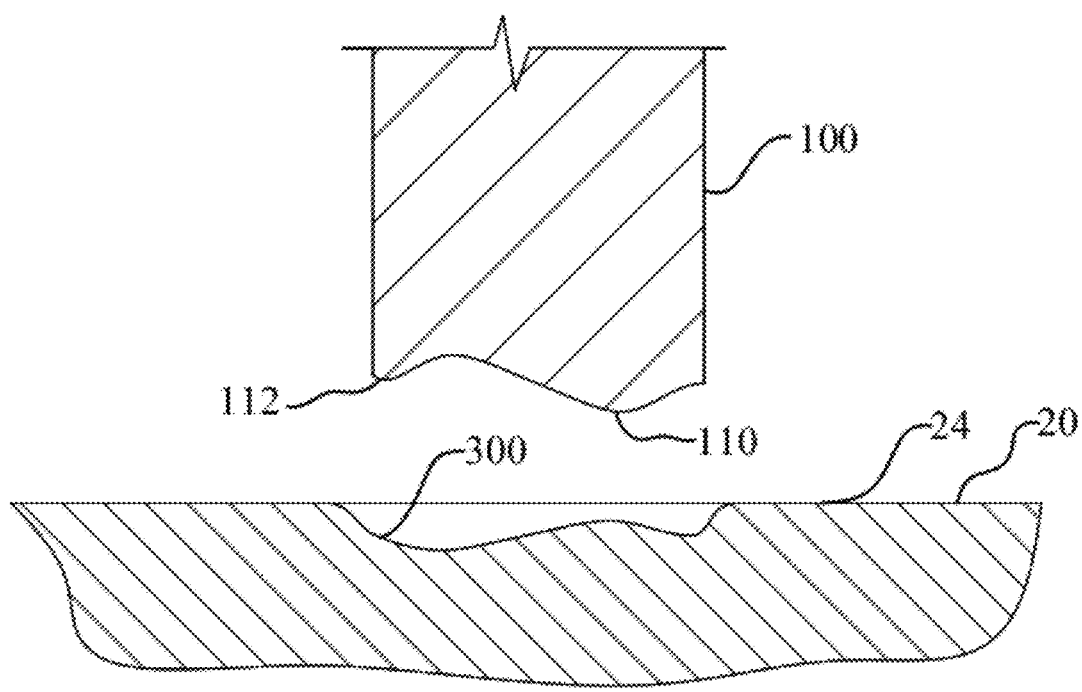
FIG. 16 is a cross-sectional view of an embodiment of a continuous irregular tool face for forming an indentation, not to scale.

Tool faces (110) with complex surface geometries are also possible. Complex tool faces (110) provide a means for treating difficult working surface (24) shapes or hard-to-reach areas, such as fillets and crevasses. As such, the tool face (110) may be discontinuous regular, as seen in FIG. 13, or in other words, the face (110) may have regular repeating surface features disposed from each another by discontinuities. Similarly, the tool face (110) may be continuous regular, as seen in FIG. 14, or having a repeating regular surface feature with the absence of discontinuities. Other examples, as seen in FIGS. 15 and 16, are a discontinuous irregular tool face (110) and a continuous irregular tool face (110).

Figure 17:
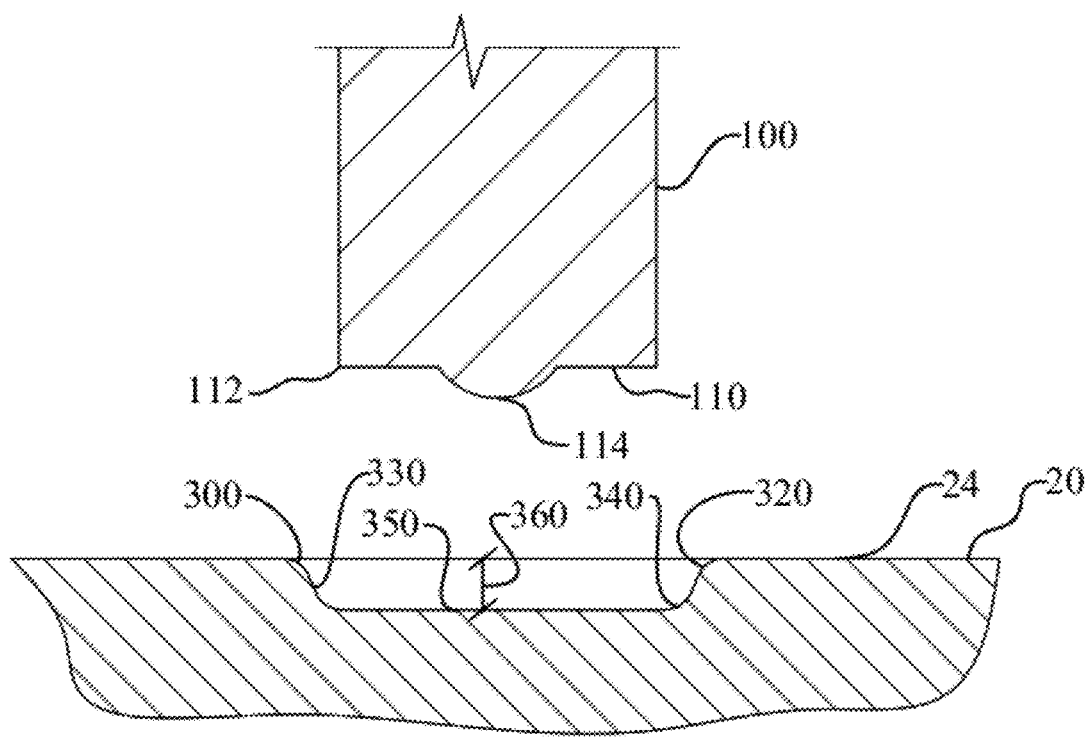
FIG. 17 is a cross-sectional view of an embodiment of a pulse concentration element in the tool face for forming an indentation, not to scale.

In yet another embodiment of the instant invention, the tool face (110) has a pulse concentration element (114), as seen in FIG. 17. As one skilled in the art will understand, the tool face (110) may influence the shape of the electromagnetic pulse. Thus, the tool face (110) may affect the topography of the indentation perimeter (310), the transition region (320), the indentation sidewall (330), the impact transition region (340), the impact region (350), and the indentation depth (360).

Figure 18A:
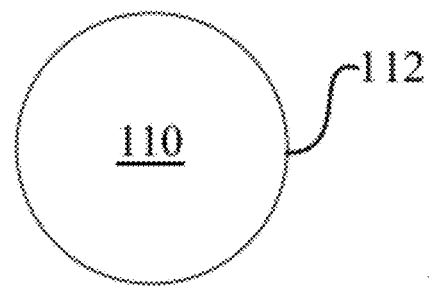
FIG. 18A shows a circular tool face perimeter taken along section line 18-18 in FIG. 9 for forming an indentation, not to scale.
Figure 18B:
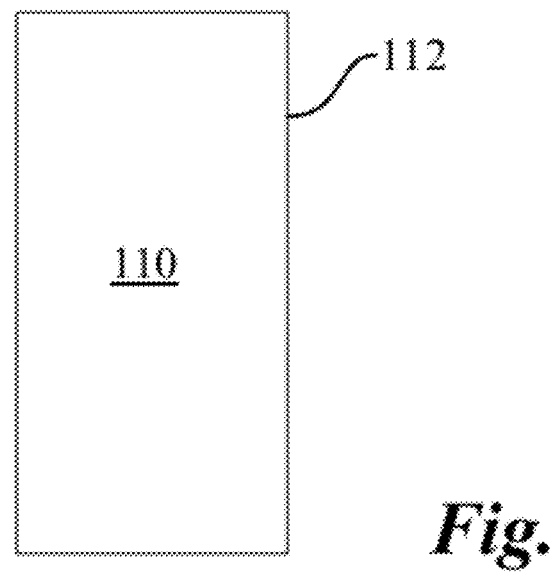
FIG. 18B shows a rectangular tool face perimeter taken along section line 18-18 in FIG. 9 for forming an indentation, not to scale.
Figure 18C:
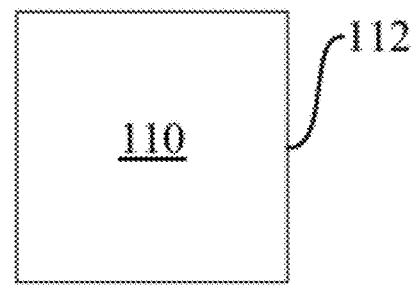
FIG. 18C shows a square tool face perimeter taken along section line 18-18 in FIG. 9 for forming an indentation, not to scale.
Figure 19A:
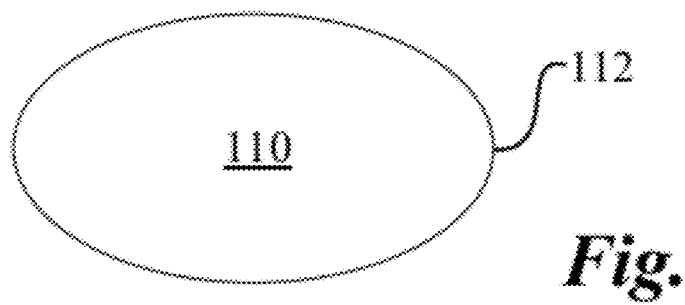
FIG. 19A shows an oval shaped tool face perimeter, not to scale.
Figure 19B:
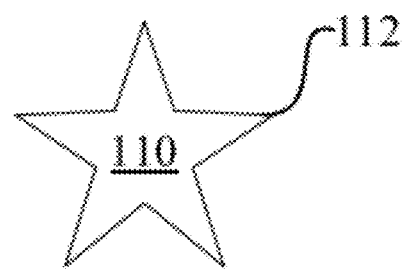
FIG. 19B shows a star shaped tool face perimeter, not to scale.
Figure 19C:
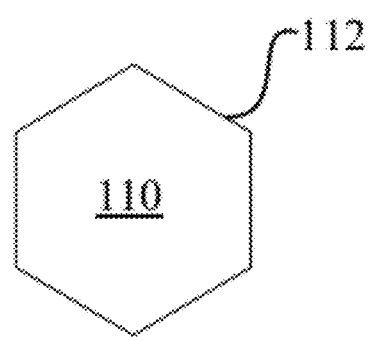
FIG. 19C shows a hexagon shaped tool face perimeter, not to scale.

Like the tool face (110), the tool face perimeter (112) may be selected from a variety of shapes and sizes. The tool face perimeter (112) influences a shape of the indentation perimeter (310). In one embodiment, the indentation (300) is similar in shape to the tool face perimeter (112). By way of example and not limitation, as seen in FIGS. 18A, 18B, and 18C, the tool face perimeter (112) may form a simple shape, such as, a square, a rectangle, or a circle, to name only a few. The tool face perimeter (112) may also be more complex such as the ovals, stars, and other polygons, as seen in FIGS. 19A, 19B, and 19C, respectively.

As previously mentioned, the working distance (130) also affects the indentation topography. Generally, as the working distance (130) increases the indentation depth (360) decreases for a given tool configuration, current pulse, and current pulse duration. In one particular embodiment of the instant invention, the working distance (130) is less than 1 millimeter, and is more typically less than 0.5 millimeters. By way of example, one benefit of controlling the working distance (130) to control the topography of the indentation (300), particularly the indentation depth (360), is that the electronics in the controller (700) are less complicated and are therefore less expensive to purchase and maintain. Thus, a system (50)

designed to generate a constant current and a constant current pulse duration will only require variable working distance (130) to form indentations (300) having a targeted indentation perimeter (310), transition regions (320, 340), and depth (360) for a given bearing surface (22). However, in stark contrast with the prior art method of shot peening, the instant invention is non-contact. In other words, the tool (100) does not intentionally touch the working surface (24).

In addition to the effects of the tool face (110), the tool face perimeter (112), and other parameters, as discussed above, those skilled in the art will also appreciate that changing the current pulse or the current pulse duration, or both, may change the indentation (300) characteristics, particularly the indentation depth (360). Generally, as the current pulse increases, the indentation depth (360) increases for a given material and working distance (130). Also, the material of the work piece (20) will, in part, determine the required current pulse. The current pulse affects the magnitude of the compressive stress, the depth (610) of the residual compressive stress layer (600), and the topography of the regions (320, 330, 340, 350). Similar to the current pulse, the current pulse duration also affects the magnetic flux density, and hence the magnitude of the repulsive forces formed in the working surface (24).

In one illustrative embodiment, the working surface (24) of the work piece (20) is made of aluminum, the electromagnetic pulse is generated by a 300 kA current pulse with a current pulse duration of 25 microseconds, the tool face (110) is flat, and the tool face perimeter (112) is formed by a 2 millimeter by 2 millimeter square made of copper. Finite Element Analysis may then be used to calculate the density of a plurality of eddy currents in the surface of the aluminum workpiece. As one skilled in the art will appreciate, the eddy currents spawn repulsive forces, called Lorentz forces. When the repulsive forces form a stress greater than the yield strength of the aluminum, the working surface (24) of the aluminum deforms inward. Thus the electromagnetic pulse forms the indentation (300).

Figure 22:
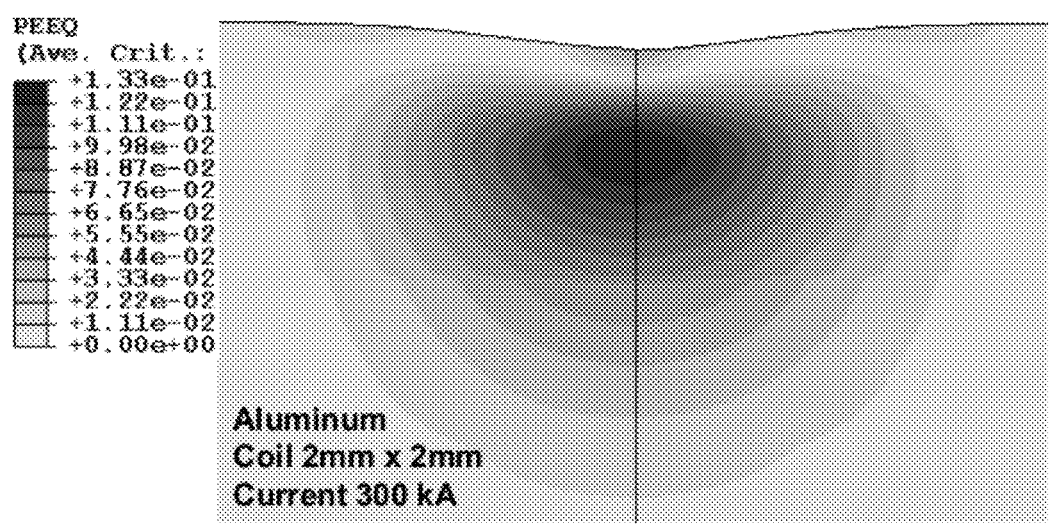
FIG. 22 shows a PEEQ, or equivalent plastic strain, contour plot calculated from Lorentz forces in an aluminum working surface, not to scale.
Figure 23:
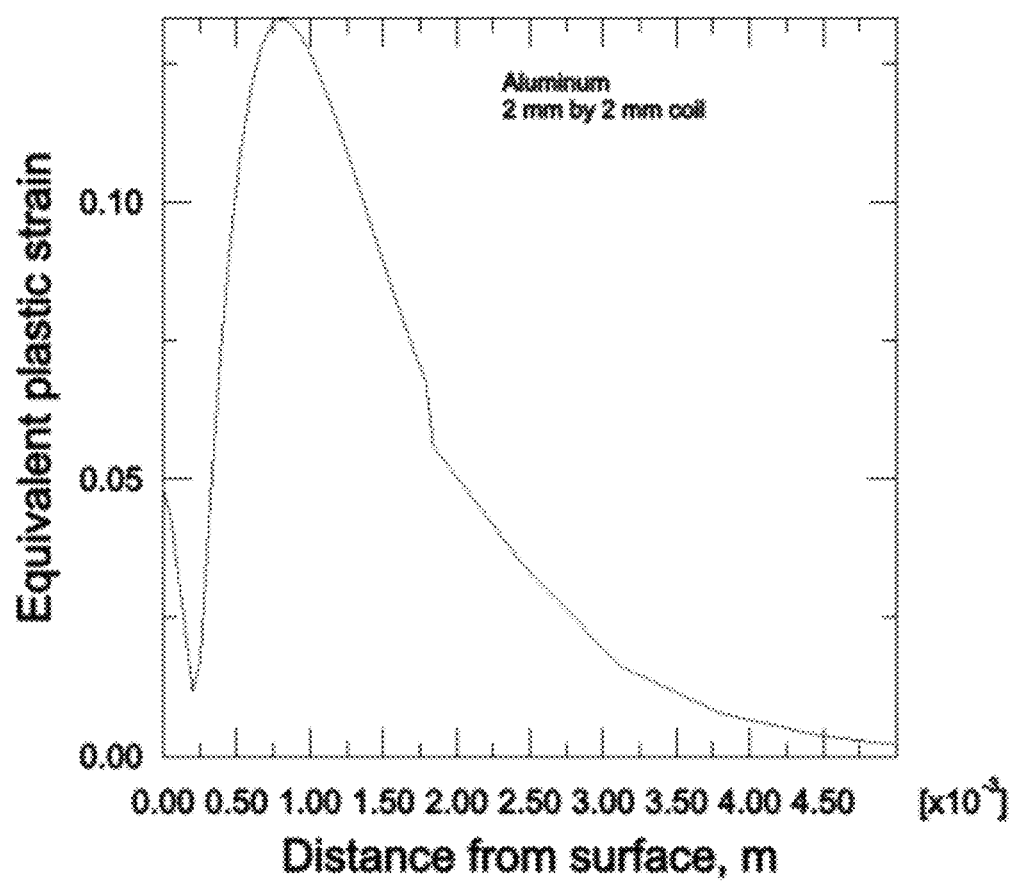
FIG. 23 shows a graph of the PEEQ contour plot, FIG. 22, not to scale.
Figure 24:
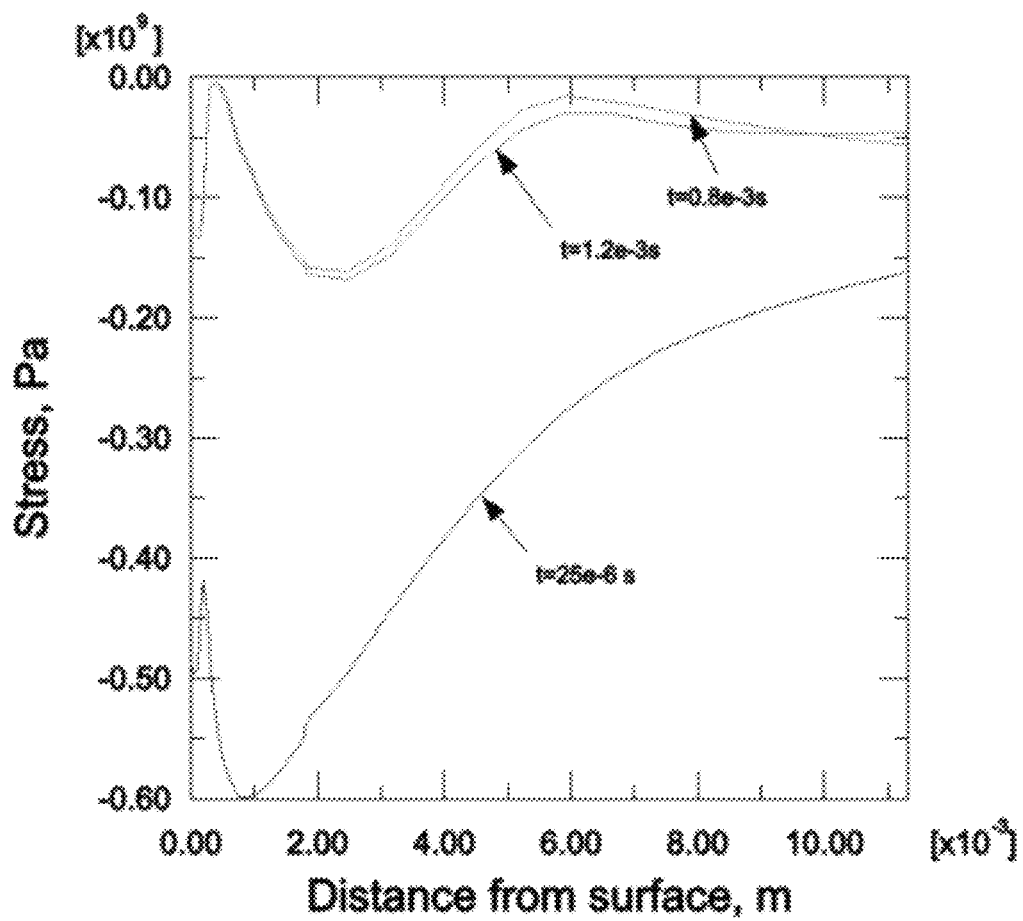
FIG. 24 shows the stress formed in a working surface varying with distance and time during the current pulse, not to scale.
Figure 25:
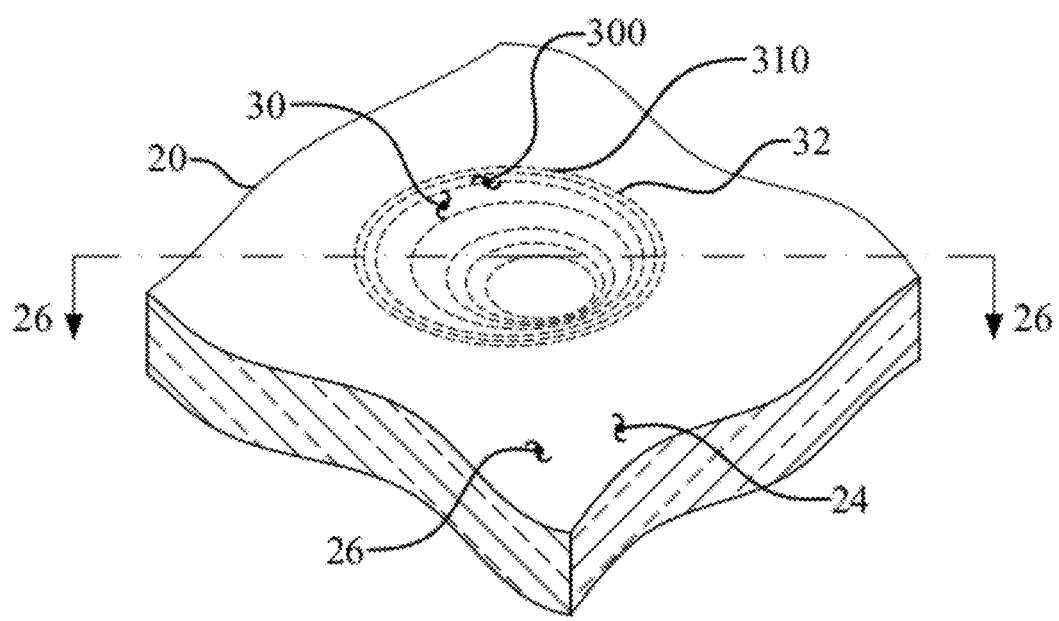
FIG. 25 is an isometric view of an asymmetric indentation formed with one embodiment of the system for electromagnetic surface treatment, not to scale.

The indentation (300) formed in the aluminum can be described in terms of the equivalent plastic strain or PEEQ. A PEEQ contour plot calculated for the indentation (300) in the aluminum working surface (24), as discussed above, is shown in FIG. 22. As one skilled in the art will understand, a distance versus equivalent plastic strain plot, derived from the PEEQ contour plot, is seen in FIG. 23. By way of example and not limitation, in the illustrative embodiment discussed above with aluminum, the indentation depth (360) is approximately 0.2 millimeters and a diameter, as measured across opposing sides of the indentation perimeter (310) is approximately 4 millimeters. In another embodiment of the instant invention, the indentation depth (360) made in aluminum is between approximately 0.1 millimeters and 0.5 millimeters. However, current pulses both higher and lower than 300 kA are possible. In another embodiment of the instant invention the current pulse duration may be 1 second due to inductance and resistance variations in the electromagnetic generator (20).

The present system for electromagnetic surface treatment (50) allows the user to form localized treated surfaces (30) down to the size of the single indentation (300), as large as the entire working surface (24) of the work piece (20), or to treat specific areas of the work piece (20). Multiple electromagnetic pulses may be directed toward the working surface (24) to form treated surfaces (30) that are larger, or that have indentation depths (360) deeper, than one indentation (300). In some cases the indentations (300) will be placed directly on top of one another, possibly to increase the compressive stresses or to increase the compressive stress layer depth (610). In other cases, following formation of the indentation (300), the system (50) expands the treated surface (30) by translating the tool (100) and forming a second indentation (400) adjacent to the indentation (300).

Figure 7:
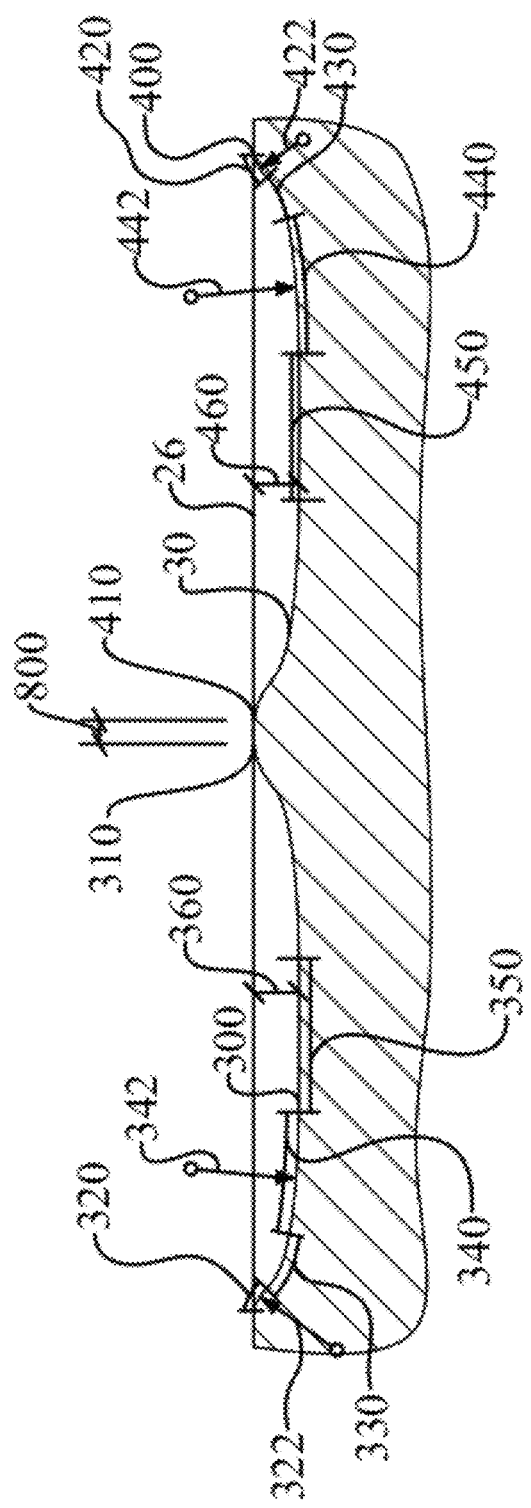
FIG. 7 is a cross-sectional view of the two indentations separated by an indent spacing, not to scale.

With reference to FIG. 5, in another embodiment of the instant invention, the system (50) forms the indentation (300) and then forms the second indentation (400). The second indentation (400) may be formed anywhere on the working surface (24). Similar to the indentation (300), the second indentation (400), as seen in FIG. 7, has a second indentation perimeter (410), a second transition region (420), a second indentation sidewall (430), a second impact transition region (440), and a second impact region (450). An indent spacing (800) may describe the distance between the indentation (300) and the second indentation (400). The indent spacing (800) may be a distance between the indentation perimeter (310) and the second indentation perimeter (410), as seen in FIG. 7.

The second transition region (420) is described by a second indentation transition radius (422) and the second impact transition region (440) is described by a second impact transition region radius (442). The second impact region (450) is depressed to below the untreated surface (26) by a second indentation depth (460).

As previously mentioned, the system (50) may form individual indentations (300, 400) separated by relatively large indent spacing (800) such that the indentations (300, 400) do not overlap. In one particular embodiment of the instant invention, the indent spacing (800) separates the indentations (300, 400) by a distance which substantially prevents tensile stress from forming in the treated surface (30). Thus, the system (50) may form treated surfaces (30) without indentation overlap but still attain beneficial stress conditions that substantially prevent tensile stress formation. The system (50) also efficiently forms the treated surface (30) such that each indentation (300) may be positioned according to a predetermined pattern resulting in no excess indentations (300). As one skilled in the art will observe, due to the improve efficiency in indentation (300) placement, the system (50) may improve throughput in a production environment by reducing cycle time per work piece (20).

However, in many instances, the second indentation (400) overlaps the indentation (300). The system (50) overlaps indentations (300) in a manner which results in a smooth and continuous surface that lacks stress concentrations. Therefore, the system (50) forms treated surfaces (30) that are vastly different from those surfaces produced by shot peening and laser peening.

Figure 6:
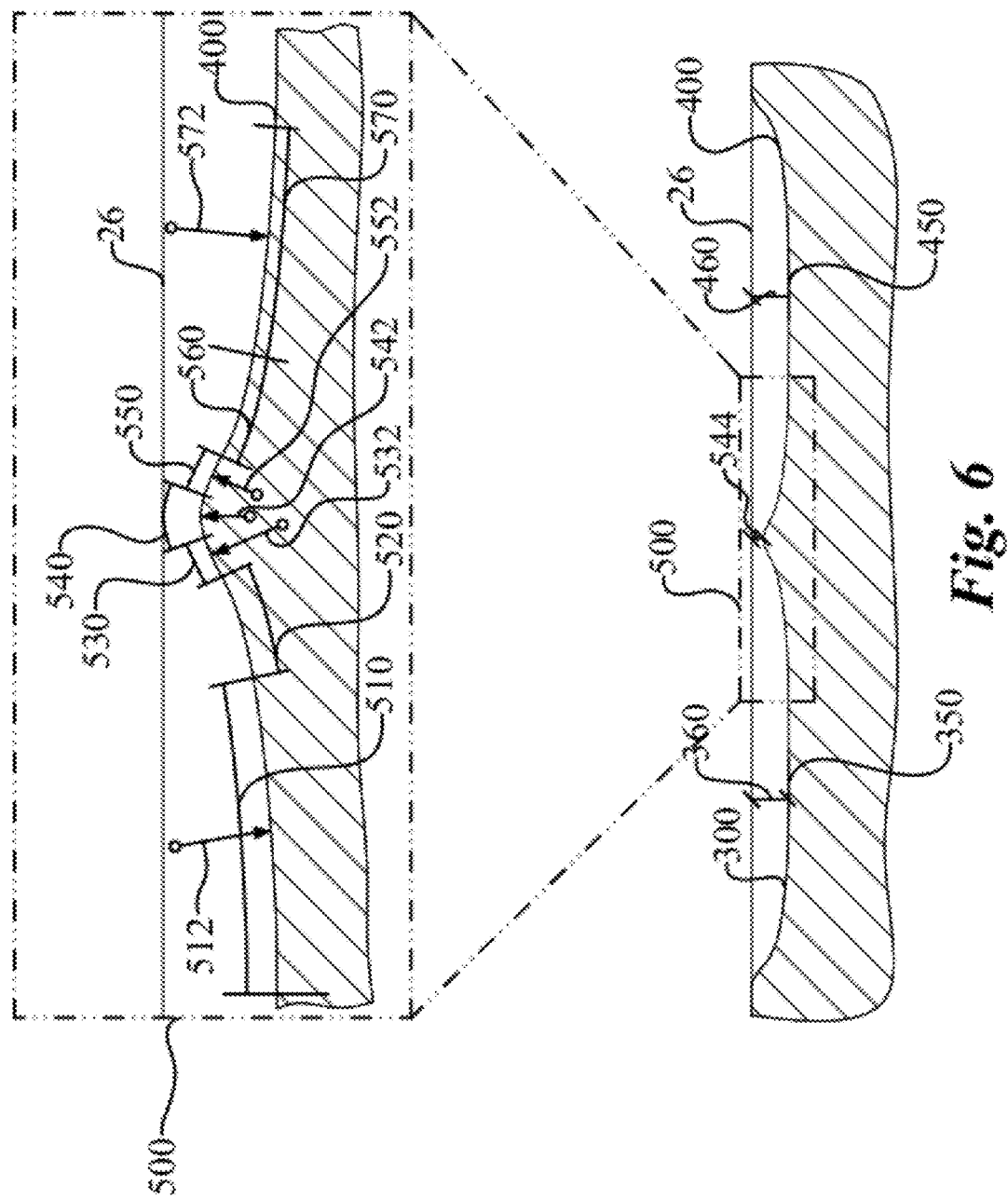
FIG. 6 is a cross-sectional view of the two overlapping indentations taken along section line 6-6 in FIG. 5, showing a topography of an inter-indentation overlap region, not to scale.

As seen in FIGS. 5 and 6, in another embodiment of the instant invention, the system (50) forms the second indentation (400) such that the indentation perimeters (310, 410) overlap. In this situation, the treated surface (30) is encompassed by both the indentation perimeters (310, 410). The indentation perimeters (310, 410) may form the treatment perimeter (32). By forming multiple indentations (300, 400), large treated surfaces (30) may be created in the working surface (24). In addition, the working surface (24) may include multiple treated surfaces (30), including one or more indentations (300), adjacent to one or more untreated surfaces (26).

In the case of overlapping indentations (300, 400), as seen in FIGS. 5 and 6, the overlap forms an inter-indentation overlap region (500). The inter-indentation overlap region (500) has an overlap impact transition region (510) which is a smooth, continuous surface that is described by an overlap impact transition region radius (512). The overlap impact transition region (510) joins an overlap sidewall (520) that is obliquely disposed from the impact region (350). The overlap sidewall (520) joins an overlap transition region (530) having an overlap transition region radius (532) that describes its curvature. The overlap transition region (530) joins an overlap working region (540). The overlap working region (540) is a smooth and continuous transition and, in one embodiment, is described by an overlap radius (542). The overlap working region (540) may reside below the level of the untreated surface (26) by an overlap depth (544). The overlap depth (544) may depend on the indent spacing (800). For example, as the indent spacing (800) indicates more overlap between the indentation (300) and the second indentation (400), the overlap depth (544) may increase. As seen in FIG. 6, the overlap depth (544) is less than the indentation depth (360) and is less than the second indentation depth (460). In another embodiment, where the indentation (300) and the second indentation (400) substantially overlap, the overlap depth (544) may be approximately equal to, or greater than, the indentation depth (360) and approximately equal to, or greater than, the second indentation depth (460). In another embodiment, the indent spacing (800) is such that the residual compressive stress layer (600) is continuous through the inter-indentation overlap region (500). Thus it is possible to create graduated stress profiles with the system (50). A desired level of stress may be achieved without forming stress concentrations by creating multiple overlapping indentations (300, 400) to target a desired overlap depth (544). By way of example and not limitation, the overlap depth (544) may be formed relatively deep in one location, such as near a weld to offset the tensile stresses that are commonly formed near welds, with the system (50) then overlapping the indentations (300,400) such that the overlap depth (800) gradually decreases to another location, for example, as the distance from the weld increases. Thus, the system (50) may improve the durability of the weld by making it less susceptible to cracking As seen in FIG. 6, the inter-indentation overlap region (500) has a second overlap transition region (550), a second overlap sidewall (560), and a second overlap impact transition region (570). As with the other transition regions, the second overlap transition region (550) has a second overlap transition region radius (552), and the second overlap impact transition region (570) has a second overlap impact transition region radius (572). The second regions (550, 560, 570) describe the surface of the second indentation (400) in the inter-indentation overlap region (500). The system (50), therefore, produces treated surfaces (30) having inter-indentation overlap regions (500) with smooth and continuous transition regions (510, 520, 530, 540, 550, 560, 570).

One skilled in the art will observe that the inter-indentation overlap region (500) does not need to be symmetrical. Any asymmetry of the inter-indentation overlap region (500) may be a consequence of interaction between the indentations (300, 400). For example, when the system (50) forms the indentation (300) and then overlaps the second indentation (400), the plastic deformation caused by the indentation (300) may resist additional plastic deformation when the system (50) forms the second indentation (400). Additionally, asymmetry in the indentation (300) may be one effect of the formation of the second indentation (400).

As with asymmetry of the indentation (300), asymmetry of the inter-indentation overlap region (500) may be intentional. The system (50) may intentionally form the second indentation (400) by, for example, varying the tool face (110), the tool face perimeter (112), the working distance (130), the tool axis (120), and the current pulse duration, from the indentation (300) resulting in an asymmetric inter-indentation overlap region (500). For example, the tool face perimeter (112) may be gradually increased in size, such as from one circular tool face perimeter (112) diameter to a larger circular tool face perimeter (112). Similar to the effects of gradually changing the overlap depth (544), the tool face perimeter (112) may initially be small to impart deep indentation depths (360, 460) near a weld or other high tensile stress location, and the tool face perimeter (112) may be gradually increased to impart a lesser indentation depth (360, 460) as the distance from the high tensile stress location increases. The stress profile may then be tailored to form treated surfaces (30) having improved stress profiles while maintaining a smooth and continuous surface. As one skilled in the art will observe, the treated surface (30) may be designed to achieve a specific stress profile. The design may incorporate a plurality of parameters, as discussed above, to achieve a desired treated surface (30) in an economical manner.

Figure 20:
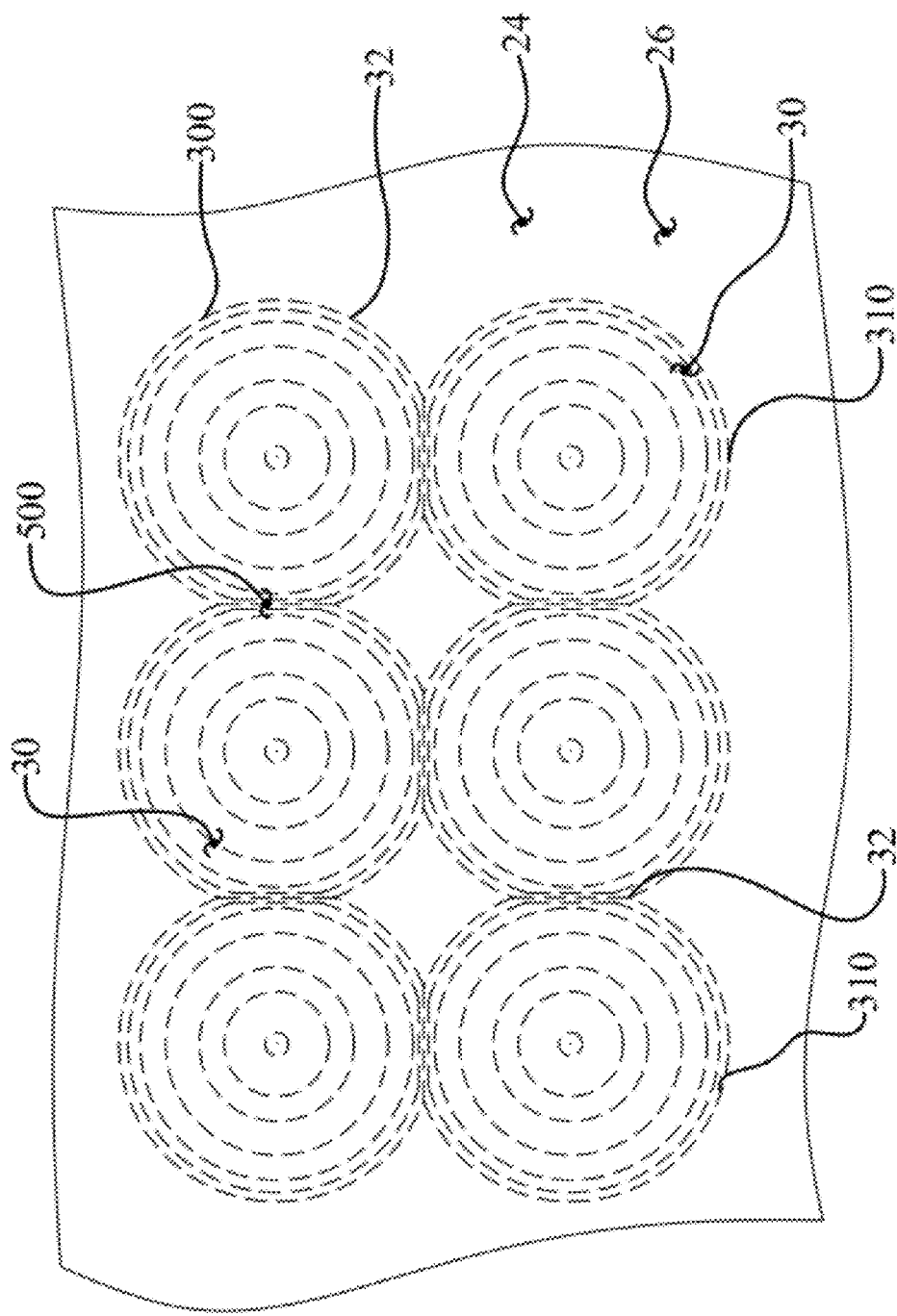
FIG. 20 a plan view of multiple overlapping indentations on a working surface forming a rectangular-shaped treated surface, not to scale.
Figure 21:
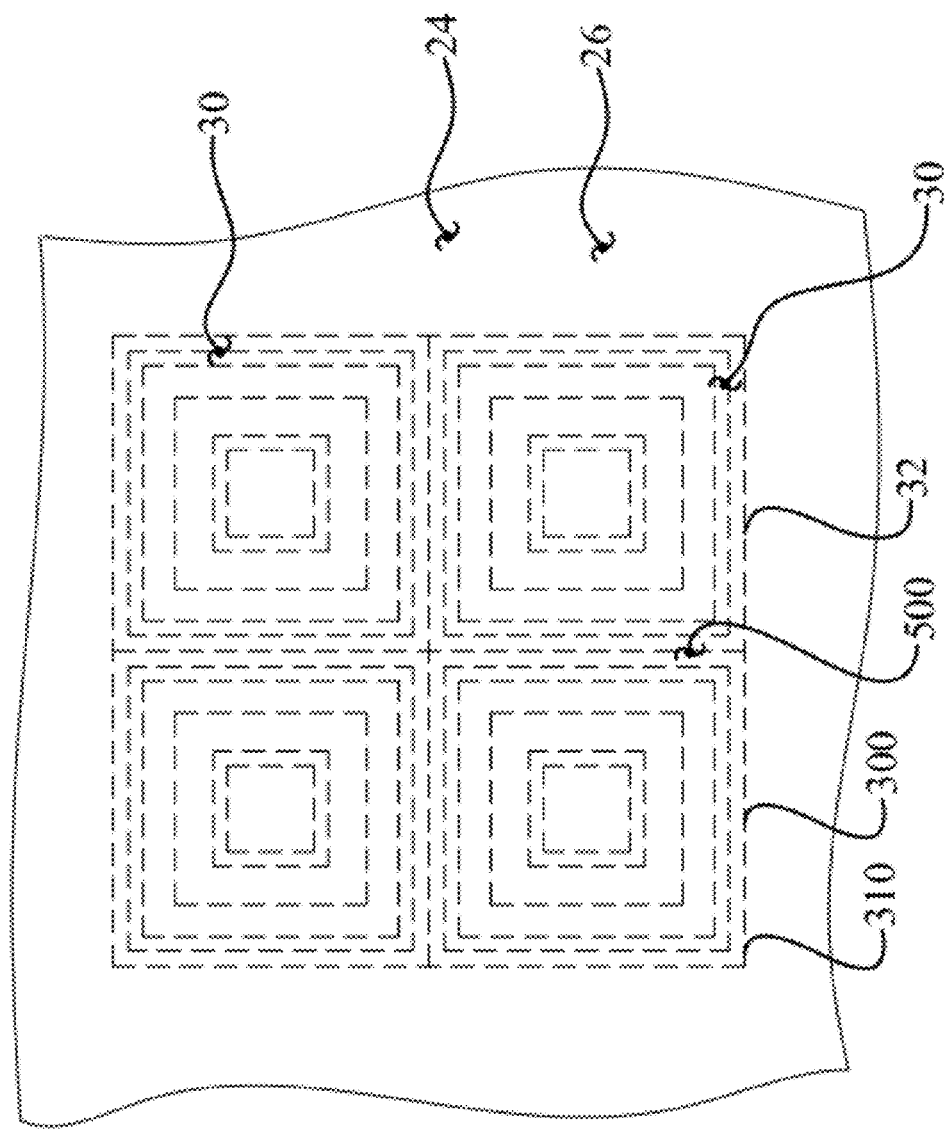
FIG. 21 is a plan view of multiple overlapping indentations on the working surface forming a square-shaped treated surface, not to scale.

In another embodiment of the instant invention, the system (50) may form the treated surfaces (30) which have a variety of shapes. In addition, the treatment perimeter (32) shape may differ from the tool face perimeter (112). For example, as seen in FIG. 1, the electromagnetic pulse tool (100) with a flat tool face (110) and a circular tool face perimeter (112) may be used to create the treatment perimeter (32), as seen in FIG. 20, that is substantially rectangular by overlapping the indentations (300, 400). In another embodiment, the electromagnetic pulse tool (100) with a flat tool face (110), as seen in FIG. 9, and a square tool face perimeter (112), as seen in FIG. 18C, may be used to create the treatment perimeter (32), as seen in FIG. 21, that is substantially rectangular by overlapping the indentations (300). The system (50) may form treated surfaces (32) to completely cover the working surface (24), or the system (50) may form treated surfaces (32) to cover uniquely shaped areas. Usually, the treated surfaces (30) will be those areas where, when the work piece (20) is in service, tensile stresses develop on areas with initial residual tensile stress. As seen in FIGS. 20 and 21, one skilled in the art will appreciate that by varying the indent spacing (800) and the tool face perimeter (112), custom treated surfaces (30) with smooth and continuous surfaces are formed in the work piece (20).

Although FIG. 1 illustrates the work piece (20) as having planar features, the work piece (20) may be cylindrical, spherical, or have a complex geometry, for example, a turbine airfoil for an aircraft engine. The system (50) may form treated surfaces (30) on the turbine airfoil localized to the areas of the turbine airfoil that are prone to develop tensile stresses while in service. Localized treated surfaces (30) improve the fatigue life of the turbine airfoil. Since the treated surface (30) is localized, it can be performed more quickly, cheaply, and cleanly than prior art systems and methods.

As previously mentioned, the system (50) may utilize other tool configurations. In its simplest form the system (50) for electromagnetic surface treatment has of a single electromagnetic pulse tool (100) connected to a single electromagnetic pulse generator (200). However, one skilled in the art will recognize that multiple electromagnetic pulse tools (100) in electrical communication with the electromagnetic pulse generator (200) are possible. Further, a single tool (100) may have multiple pulse concentration elements (114) to generate multiple indentations (300) per current pulse. Also, multiple tools (100) may be connected to a single electromagnetic pulse generator (200) or an equal number of electromagnetic pulse generators (200). For example, the system (50) may have multiple tools (100) to simultaneously form indentations (300) having a unique pattern or to simultaneously form unique treated surfaces (30). The system (50) may therefore have multiple tool faces (110) and tool face perimeters (112) in a prearranged pattern that may be discharged individually according to a predetermined order, or discharged simultaneously, to form treated surfaces (30) having smooth and continuous surfaces. The system (50) is aptly suited for manufacturing environments due to its capability for rapid, repeatable surface treatment. The system (50) may be equally useful for custom surface treatment of hard-to-treat objects, such as butt welds on piping in the field. Finally, multiple electromagnetic pulse tools (100) may be positioned to form treated surfaces (30) on opposing sides of the work piece (20), simultaneously. With this setup, the forces on both sides of the work piece (20) may cancel each other out thereby requiring less support from the fixture (10).

In another embodiment of the instant invention, the system (50) has a controller (700), as seen in FIG. 1. In one embodiment of the system (50), the controller (700) is preprogrammed with a variety of data and information regarding optimum tool (100) parameters, current pulse, and current pulse duration for various material types and for the shape and size of the work piece. In addition, the controller (700) may also be preprogrammed with tool face (110) and tool face perimeters (112) that form treated surfaces (30) having a predetermined shape or predetermined stress levels for a variety of work piece shapes and materials. Further, the controller (700) may include finite element analysis software to model residual tensile stress profiles and automatically determine a surface treatment strategy, including indent spacing (800), size, and depth of indentations (300, 400).

In another embodiment, the controller (700) may integrate information from various sensors that are capable of measuring stress, indentation depth (360), and other material related parameters, such as hardness. The controller (700) may then adapt or modify tool (100) parameters, current pulse, current pulse duration, working distance (130), and tool axis (120), to name only a few of the possible parameters, until a desired overlap depth (544), stress level, or other target is achieved.

The controller (700) may coordinate the positioning of the tool (100) at various tool working distances (130) and tool axes (120) with activation of the electromagnetic pulse generator (200). The controller (700) may be, for example, programmed to create treated surfaces (32) in a predetermined pattern along the working surface (24). The controller (700) may also coordinate tool (100) changes, such that the system (50) may use a variety of tool faces (110) and tool face perimeters (112) on a single work piece (20). The controller (700) may also communicate with other equipment to coordinate the transfer of one work piece (20) out of the system (50) and to bring another work piece (20) into the system (50) for treatment, for example, in a manufacturing environment. In another embodiment of the instant invention, the controller (700) may move the tool (100) while energizing the electromagnetic pulse generator (200). Therefore, the work piece (20) may receive electromagnetic pulses while the tool (100) moves across the work piece's (20) surface.

Numerous alterations, modifications, and variations of the embodiments disclosed herein will be apparent to those skilled in the art and they are all anticipated and contemplated to be within the spirit and scope of the instant invention. For example, although specific embodiments have been described in detail, those with skill in the art will understand that the preceding embodiments and variations can be modified to incorporate various types of substitute and or additional or alternative materials, relative arrangement of elements, and dimensional configurations. Accordingly, even though only few variations of the present invention are described herein, it is to be understood that the practice of such additional modifications and variations and the equivalents thereof, are within the spirit and scope of the invention as defined in the following claims. The corresponding structures, materials, acts, and equivalents of all means or step plus function elements in the claims below are intended to include any structure, material, or acts for performing the functions in combination with other claimed elements as specifically claimed.

We claim:

1. An electromagnetic pulse surface treatment system for treating a work piece, having a bearing surface and a working surface, with a single electromagnetic pulse, comprising:
    an electromagnetic pulse generator having a power supply and a capacitor,
    wherein the electromagnetic pulse generator produces a current pulse having a current pulse duration;
    an electromagnetic pulse tool in electrical communication with the electromagnetic pulse generator, wherein the electromagnetic pulse tool has a tool face and the tool face has a tool face perimeter, for forming and directing the single electromagnetic pulse toward the working surface; and
    a controller to control operation of the electromagnetic pulse generator to generate the current pulse which travels to the electromagnetic pulse tool such that the single electromagnetic pulse emanates from the electromagnetic pulse tool to produce an indentation and a residual compressive stress layer in the working surface with substantially no stress change in the bearing surface opposite the residual compressive stress layer, wherein the tool face produces the indentation entirely below an untreated surface and free of pile-up above the level of the untreated surface along a perimeter of the indentation, and wherein the indentation is free of sharp transitions and comprises only smooth and continuous surfaces having radii greater than 1 millimeter and an indentation depth of less than 0.5 millimeter.

2. The system of claim 1, wherein the controller further includes a sensor to measure the stress at the bearing surface opposite the residual compressive stress layer to ensure the stress does exceed the yield strength of the work piece.

3. The system of claim 1, wherein the controller further includes an indentation depth sensor to measure an indentation depth upon creation of the indentation, and the controller compares the measured indentation depth to a target depth and adjusts at least one parameter selected from the parameter group including a current pulse magnitude, a current pulse duration, and a working distance from the working surface, in response to the comparison.

4. The system of claim 3, wherein the controller controls the movement of the electromagnetic pulse tool and positions the tool face at the working distance from the working surface.

5. The system of claim 4, wherein the at least one parameter selected from the parameter group is the working distance.

6. The system of claim 1, further including at least a second electromagnetic pulse tool in electrical communication with the electromagnetic pulse generator wherein the second electromagnetic pulse tool has a second tool face and the second tool face has a second tool face perimeter, different from the tool face perimeter, for forming and directing a second electromagnetic pulse toward the working surface, wherein the controller controls operation of the electromagnetic pulse generator to generate a second current pulse which travels to the second electromagnetic pulse tool such that the second electromagnetic pulse emanates from the second electromagnetic pulse tool to produce a second indentation and a second residual compressive stress layer in the working surface with substantially no stress change in the bearing surface opposite the second residual compressive stress layer.

7. The system of claim 6, wherein the controller controls the current pulse and the second current pulse so that the electromagnetic pulse and the second electromagnetic pulse occur simultaneously.

8. The system of claim 6, wherein the controller controls the current pulse and the second current pulse so that the electromagnetic pulse and the second electromagnetic pulse are not simultaneous.

9. The system of claim 1, wherein the controller includes at least one predetermined treatment pattern and automatically moves the electromagnetic pulse tool and discharges the electromagnetic pulse to achieve the predetermined treatment pattern.

10. The system of claim 1, wherein the current pulse is 300 kA or less and the current pulse duration is 1 second or less.

11. The system of claim 10, wherein the surface area of the tool face is no more than 4 mm$^2$.

12. The system of claim 11, wherein the tool face has a pulse concentration element to influence the shape of the electromagnetic pulse.

13. An electromagnetic pulse surface treatment system for treating a work piece having a working surface, with an electromagnetic pulse, comprising:
    an electromagnetic pulse generator having a power supply and a capacitor, wherein the electromagnetic pulse generator for generating a current pulse, wherein the current pulse has a current pulse duration;
    a set of electromagnetic pulse tools including at least a first electromagnetic pulse tool and a second electromagnetic pulse tool, wherein:
        the first electromagnetic pulse tool is configured for electrical communication with the electromagnetic pulse generator, wherein the first electromagnetic pulse tool has a first tool face and the first tool face has a first tool face perimeter, for forming and directing a first electromagnetic pulse toward the working surface, wherein a portion of the first tool face is a working distance of less than 1.0 millimeter from the working surface and no portion of the first tool face is in contact with the working surface; and
        the second electromagnetic pulse tool is configured for electrical communication with the electromagnetic pulse generator, wherein the second electromagnetic pulse tool has a second tool face and the second tool face has a second tool face perimeter that is different than the first tool face perimeter, for forming and directing a second electromagnetic pulse toward the working surface, wherein a portion of the second tool face is a working distance of less than 1.0 millimeter from the working surface and no portion of the second tool face is in contact with the working surface; and
    a controller to control operation of the electromagnetic pulse generator to generate the current pulse which travels to either the first electromagnetic pulse tool or the second electromagnetic pulse tool such that the electromagnetic pulse emanates from the first electromagnetic pulse tool or the second electromagnetic pulse tool to produce an indentation and a residual compressive stress layer in the working surface with substantially no stress change in a surface opposite the residual compressive stress layer, and both the first tool face and the second tool face are configured to produce the indentation entirely below an untreated surface and free of pile-up above the level of the untreated surface alone a perimeter of the indentation, and wherein the indentation is free of sharp transitions and comprises only smooth and continuous surfaces having radii greater than 1 millimeter and an indentation depth of less than 0.5 millimeter.

14. The system of claim 13, wherein a curvature of the second tool face is different than the first tool face.

15. The system of claim 13, wherein the second tool face is asymmetric.

16. The system of claim 13, wherein the first tool face has a pulse concentration element to influence the shape of the electromagnetic pulse, and the second tool face is flat.

17. The system of claim 13, wherein the controller further includes an indentation depth sensor to measure an indentation depth upon creation of the indentation, and the controller compares the measured indentation depth to a target depth and adjusts at least one parameter selected from the parameter group including a current pulse magnitude, a current pulse duration, and a working distance from the working surface, in response to the comparison.

18. An turbine airfoil electromagnetic pulse surface treatment system for treating a portion of a turbine airfoil having a working surface, with an electromagnetic pulse, comprising:
    an electromagnetic pulse generator for generating a current pulse, wherein the current pulse has a current pulse duration;
    an electromagnetic pulse tool in electrical communication with the electromagnetic pulse generator, wherein the electromagnetic pulse tool has a tool face and the tool face has a tool face perimeter, for forming and directing the electromagnetic pulse toward the working surface; a second electromagnetic pulse tool in electrical communication with the electromagnetic pulse generator, wherein the second electromagnetic pulse tool has a second tool face and the second tool face has a second tool face perimeter for forming and directing a second electromagnetic pulse toward a second working surface on an opposite side of the turbine airfoil from the working surface wherein the electromagnetic pulse tool and the second electromagnetic pulse tool are configured in substantially opposing orientation on opposite sides of the turbine airfoil to substantially cancel the forces generated by the electromagnetic pulses;
    a controller to control operation of the electromagnetic pulse generator to generate (a) the current pulse which travels to the electromagnetic pulse tool such that the electromagnetic pulse emanates from the electromagnetic pulse tool to produce an indentation and a residual compressive stress layer in the working surface, and (b) a second current pulse, simultaneous with the current pulse, which travels to the second electromagnetic pulse tool such that the second electromagnetic pulse emanates from the second electromagnetic pulse tool to produce a second indentation and a second residual compressive stress layer in the working surface, wherein the tool face and the second tool face produce indentations entirely below an untreated surface and free of pile-up above the level of the untreated surface along a perimeter of the indentation, and wherein the indentations are free of sharp transitions and comprises only smooth and continuous surfaces having radii greater than 1 millimeter and an indentation depth of less than 0.5 millimeter.

19. The system of claim 18, wherein the second tool face perimeter is different from the tool face perimeter.

* * * * *